(12) United States Patent
King et al.

(10) Patent No.: US 8,769,902 B2
(45) Date of Patent: Jul. 8, 2014

(54) TILE SYSTEMS AND METHODS OF MAKING AND USING SAME

(75) Inventors: Wesley A. King, Rockwall, TX (US); Wolfgang Zimmerman, Sunnyvale, TX (US)

(73) Assignee: Mohawk Carpet Corporation, Calhoun, GA (US)

( * ) Notice: Subject to any disclaimer, the term of this patent is extended or adjusted under 35 U.S.C. 154(b) by 58 days.

(21) Appl. No.: 13/139,981

(22) PCT Filed: Dec. 15, 2009

(86) PCT No.: PCT/US2009/068113
§ 371 (c)(1),
(2), (4) Date: Aug. 16, 2011

(87) PCT Pub. No.: WO2010/075104
PCT Pub. Date: Jul. 1, 2010

(65) Prior Publication Data
US 2011/0289864 A1    Dec. 1, 2011

Related U.S. Application Data

(60) Provisional application No. 61/122,607, filed on Dec. 15, 2008.

(51) Int. Cl.
*E04B 2/00* (2006.01)
*E04B 5/00* (2006.01)
*E04B 9/00* (2006.01)

(52) U.S. Cl.
USPC ........ 52/506.06; 52/126.3; 52/511; 52/489.2; 52/710; 52/747.11

(58) Field of Classification Search
USPC ................ 52/126.3, 506.06, 511, 512, 489.1, 52/489.2, 477, 384, 710, 747.11
See application file for complete search history.

(56) References Cited

U.S. PATENT DOCUMENTS 4,060,951 A * 12/1977 Gere ............................... 52/508
4,312,165 A *  1/1982 Mizusawa ..................... 52/511
(Continued)

FOREIGN PATENT DOCUMENTS

DE    2833640    3/1979
DE    3841179    8/1990
(Continued)

OTHER PUBLICATIONS

International Search Report and Written Opinion dated Aug. 2, 2010 for related PCT Application No. PCT/US2009/068113.

*Primary Examiner* — Brian Glessner
*Assistant Examiner* — Brian D Mattei
(74) *Attorney, Agent, or Firm* — Troutman Sanders LLP; Benjamin C. Wiles; Troy S. Kleckley

(57) ABSTRACT

A tile system, comprising: —a mounting unit, e.g. a rail fixed to a wall; —a tile unit, e.g. a frame holding a decorative tile; —a tile unit-fastening device configured to fasten the tile unit to the mounting unit, e.g. a pin engaging recesses formed on the mounting and the tile unit, the tile unit-fastening device preferably comprising a repositioning mechanism configured to allow the tile unit to move in one or two directions parallel to the wall after the tile unit is fastened to the mounting unit, e.g. the pin having ribs on its outer surface and the recesses being elongated and having cooperating ribs on their elongated inner faces.

36 Claims, 21 Drawing Sheets

(56) References Cited

U.S. PATENT DOCUMENTS

| | | | |
|---|---|---|---|
| 4,568,215 A * | 2/1986 | Nelson | 403/13 |
| 5,138,809 A * | 8/1992 | Saikachi | 52/235 |
| 5,263,292 A * | 11/1993 | Holland et al. | 52/235 |
| 5,505,029 A * | 4/1996 | Lind | 52/235 |
| 6,226,947 B1 * | 5/2001 | Bado et al. | 52/483.1 |
| 2002/0023398 A1 * | 2/2002 | Ito | 52/220.1 |
| 2006/0260223 A1 * | 11/2006 | Wang | 52/177 |

FOREIGN PATENT DOCUMENTS

| | | | |
|---|---|---|---|
| EP | 1726737 | 11/2006 | |
| EP | 1726737 A2 * | 11/2006 | E04F 13/08 |
| FR | 2564537 | 11/1985 | |
| WO | 83/03277 | 9/1983 | |

* cited by examiner

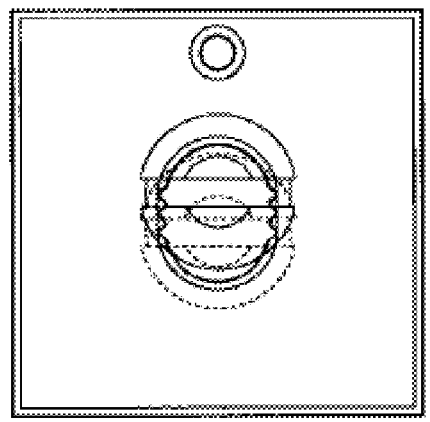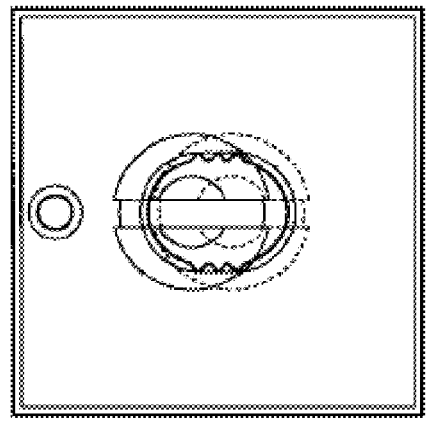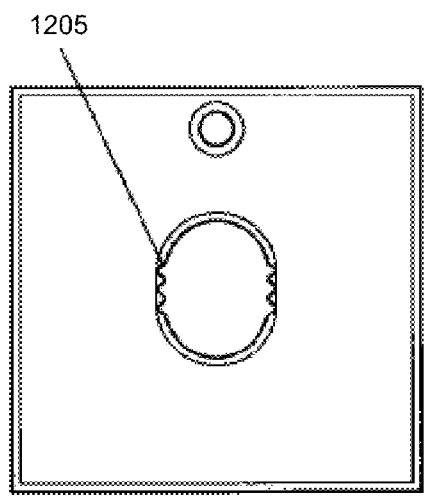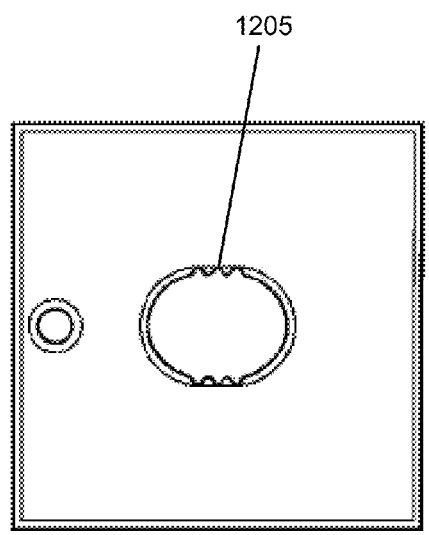
Fig. 12

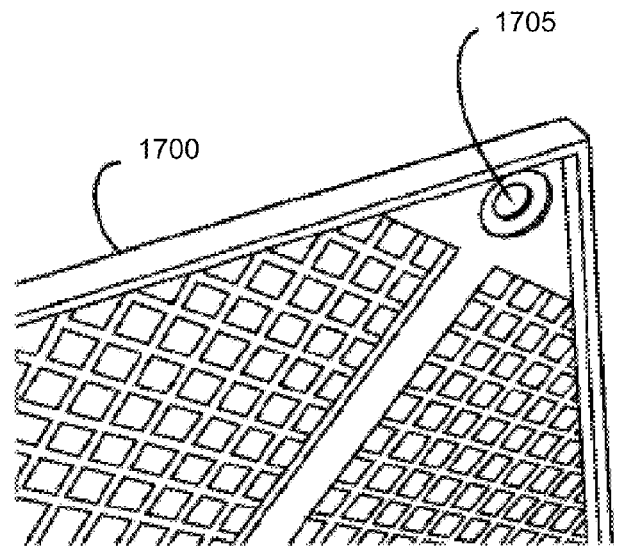
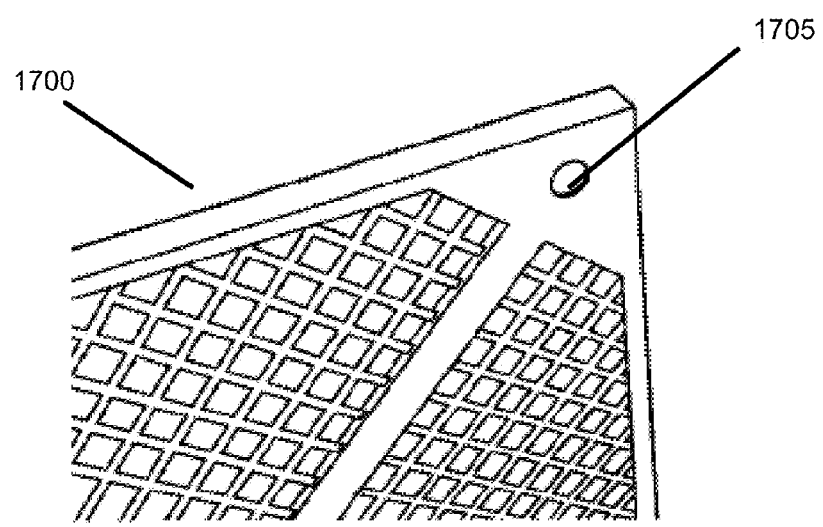
Fig. 18

TILE SYSTEMS AND METHODS OF MAKING AND USING SAME

CROSS-REFERENCE TO RELATED APPLICATION

The present application is a United States National Stage Patent Application of International Patent Application Serial No. PCT/US2009/068113, filed 15 Dec. 2009, and entitled "Tile Systems and Methods of Making and Using Same," which claimed the benefit of U.S. Provisional Patent Application Ser. No. 61/122,607 filed 15 Dec. 2008, and entitled "Tile Systems and Methods of Making and Using Same," which is hereby incorporated by reference in its entirety as if fully set forth below.

TECHNICAL FIELD

The various embodiments of the present invention relate generally to decorative tiles and their installation. More particularly, the various embodiments of the invention relate to improved decorative tile systems for use on walls and to methods of making and using such tile systems.

BACKGROUND

Decorative tiles are widely used as wall coverings in both residential and commercial applications, owing at least in part to their versatility, availability in nearly unlimited colors and designs, and durability. Such decorative tiles can be formed from ceramic, marble, granite, quartz, natural stone, porcelain, wood, glass, a variety of metals or polymers, and the like.

When decorative tiles are installed, they are generally laid side-by-side on the intended mounting surface. The tiles are typically affixed directly to the intended mounting surface using one or more of a number of fixatives, including organic adhesives, cementitious thin-sets, mechanical fasteners (e.g., nails, screws, hook-and-loop fasteners, or the like), or the like. The choice of fixative will depend on the composition of the tile and the surface to which it will be mounted. Finally, a cementitious grout material is normally inserted into the joints between adjacent tiles in order to obtain the finished appearance.

The installation process can be quite labor intensive. For example, with wall tiles, installation often requires several days to affix, place, and grout the tiles, including the requisite time to allow the fixative and grout to cure or set.

In recent years, manufacturers have attempted to produce so-called do-it-yourself tile systems that are intended to be easier to install. The goal of such systems is to eliminate the need for skilled labor to correctly and attractively install the tile and finish it with grouting material and/or minimize the amount of time required for the fixative to cure or set. These do-it-yourself designs are mostly aimed toward flooring installations as they generally rely on a combination of the force of gravity, some level of interlocking between adjacent tiles, and/or the dispensing of some type of adhesive during installation to keep the tile in place. In contrast, for wall applications, the tile should be securely fixed to the wall surface to counter the force of gravity. As a result, the do-it-yourself designs are generally not appropriate for installation on walls. In addition, if it is desirable for the installed tiles to be easily removable without causing damage to the tiles or the wall, then normal fixatives for securing the tiles to walls (e.g., adhesives, mastics, cements, and the like) will not be suitable.

Accordingly, there is a need for improved wall tile systems. It is to the provision of such systems, and the associated methods of manufacture and use that the various embodiments of the present invention are directed.

BRIEF SUMMARY

Various embodiments of the present invention are directed to improved wall tile systems. Other embodiments are directed to methods of making the wall tile systems. Still other embodiments are directed to methods of using the wall tile systems.

Each tile system generally includes, at the minimum, a mounting unit and a tile unit. The tile unit includes a decorative tile, and the mounting unit includes a base unit. The tile system can also include a wall-fastening device that is configured to fasten the mounting unit to a wall. Similarly, the tile system can also include a tile unit-fastening device that is configured to fasten the tile unit to the mounting unit. The mounting unit occupies a small fraction (e.g., less than 30 percent) of an area of the wall. When the tile unit is fastened to the mounting unit, and the mounting unit is fastened to the wall, at least a portion of the tile unit does not contact the wall directly. This portion corresponds to at least the portion that is fastened to the mounting unit, but can include up to the entire surface of the tile unit.

In some cases, the tile unit of the tile system includes a tile platform, where the decorative tile is disposed on or in the tile platform, and where at least a portion of the tile platform contacts the mounting unit when the tile unit is fastened to the mounting unit. The tile platform can be a frame component that encapsulates the decorative tile on at least a portion of five sides of the decorative tile. In some cases, the frame component is formed form a polymeric material. Alternatively, the tile platform can be a solid (i.e., fully dense) or porous board.

In some cases, the base unit of the mounting unit comprises a rail-like structure.

The wall-fastening device can be integrated into the tile unit, mounting unit, or both.

The tile unit-fastening device can, in some implementations, include a first portion and a second portion, where the second portion is configured to engage the first portion to fasten the tile unit to the mounting unit. The first portion can extend from the mounting unit in a direction opposite from the wall, and the second portion can be a recessed portion in the tile unit. Similarly, the first portion can extend from the tile unit in a direction opposite from the decorative tile, and the second portion can be a recessed portion in the mounting unit. In some situations, the first portion is integral to the tile unit; and in other situations, the first portion is integral to the mounting unit. It is also possible for the first portion to have a repositioning mechanism configured to allow the tile unit to move in one direction parallel to the wall after the tile unit is fastened to the mounting unit.

In other implementations of the tile system, the tile unit-fastening device includes a first portion, a second portion, and a third portion, where the second portion is configured to engage both the first and third portions to fasten the tile unit to the mounting unit. The first portion can be a recessed portion in the tile unit, the third portion can be a recessed portion in the mounting unit, and the second portion can be a peg. The first portion and the third portion can extend from the mounting unit in a direction opposite from the wall, and the second portion can be a recessed portion in the tile unit. Similarly, the first portion and the third portion can extend from the tile unit in a direction opposite from the decorative tile, and the second portion can be a recessed portion in the mounting unit. It is also possible for the first portion and the third portion to each have a repositioning mechanism that is configured to allow the tile unit to move in one direction parallel to the wall after the tile unit is fastened to the mounting unit. When both repositioning mechanisms are used, the tile unit can move in both an x- and a y-direction, where the plane perpendicular to the wall is the z-direction.

In some implementations of the tile system, when the tile unit is fastened to the mounting unit and the mounting unit is fastened to the wall, there is a gap between at least a portion of the tile unit and the wall. This gap can provides a location for electrical wiring, plumbing, thermal insulation, sound insulation, or an electronic device. Examples of electronic devices include a camera, speaker, photovoltaic cell, thermoelectric device, electrical heater, antenna, or a combination comprising at least one of the foregoing.

According to other embodiments of the present invention, A tile system can include a plurality of tile units, such that each tile unit of the plurality of tile units comprises a decorative tile; a plurality of mounting units, such that each mounting unit of the plurality of mounting units comprises a base unit; a plurality of wall-fastening devices, such that each wall-fastening device of the plurality of wall-fastening devices is configured to fasten at least a portion of one mounting unit of the plurality of mounting units to a wall; and a plurality of tile unit-fastening devices, such that each tile unit-fastening device of the plurality of tile unit-fastening devices is configured to fasten at least a portion of one tile unit to one mounting unit of the plurality of mounting units. The plurality of mounting units occupies a small fraction (e.g., less than 30 percent) of an area of the wall. When the tile units are fastened to the mounting units, and the mounting units are fastened to the wall, at least a portion of each tile unit of the plurality of tile units does not contact the wall directly.

Within such a tile system, each tile unit can further include a tile platform, where the decorative tile is disposed on or in the tile platform, and where at least a portion of the tile platform contacts the mounting unit when the tile unit is fastened to the mounting unit. In some cases, the tile platform is a frame component that encapsulates the decorative tile on at least a portion of five sides of the decorative tile. In other cases, the tile platform can be a solid or porous board.

In some implementations of the tile system, each base unit has a rail-like structure.

In some situations, each tile unit-fastening device includes a first portion and a second portion, where the second portion is configured to engage the first portion to fasten at least the portion of the one tile unit to the one mounting unit. The first portion can extend from the one mounting unit in a direction opposite from the wall, while the second portion can be a recessed portion in the one tile unit. Alternatively, the first portion can extend from the one tile unit in a direction opposite from the decorative tile, while the second portion is a recessed portion in the one mounting unit. It is possible for the first portion to have a repositioning mechanism that is configured to allow the one tile unit to move in one direction parallel to the wall after the one tile unit is fastened to the one mounting unit.

In other situations, tile unit-fastening devices include a first portion, a second portion, and a third portion, where the second portion is configured to engage both the first and third portions to fasten at least the portion of the one tile unit to the one mounting unit. The first portion can be a recessed portion in the one tile unit, the third portion can be a recessed portion in the one mounting unit, and the second portion can be a peg. The first portion and the third portion can extend from the one mounting unit in a direction opposite from the wall, while the second portion is a recessed portion in the one tile unit.

Alternatively, the first portion and the third portion can extend from the one tile unit in a direction opposite from the decorative tile, while the second portion is a recessed portion in the one mounting unit. It is possible for the first portion and the third portion to each comprise a repositioning mechanism configured to allow the one tile unit to move in one direction parallel to the wall after at least the portion of the one tile unit is fastened to the one mounting unit. When both repositioning mechanisms are used, the tile unit can move in both an x- and a y-direction, where the plane perpendicular to the wall is the z-direction.

When the plurality of tile units are fastened to the plurality of mounting units, and the plurality of mounting units are fastened to the wall, there can be a gap that is created between at least a portion of each tile unit and the wall. This gap can provide a location for electrical wiring, plumbing, thermal insulation, sound insulation, or an electronic device. Examples of such electronic devices include a camera, speaker, photovoltaic cell, thermoelectric device, electrical heater, antenna, or a combination comprising at least one of the foregoing.

Depending on the orientation of the tile units, it is possible for a visible object to be placed on the wall in between at least two of the plurality of tile units. The visible object can be a camera, speaker, sign, placard, artwork, mirror, flat panel television display, computer display, light, photovoltaic cell, thermoelectric device, electrical heater, or a combination comprising at least one of the foregoing.

According to other embodiments of the present invention, a method of using a tile system can include fastening a mounting unit to a wall with a wall-fastening device, and fastening a tile unit, comprising a decorative tile, to the mounting unit with a tile unit-fastening device, such that at least a portion of the tile unit does not contact the wall.

Fastening the tile unit to the mounting unit can, in some instances, create a gap between at least a portion of the tile unit and the wall. In such situations, the method can also include disposing electrical wiring, plumbing, thermal insulation, sound insulation, an electronic device, or a combination comprising at least one of the foregoing in the gap between the wall and at least the portion of the tile unit.

In some implementations of the method, the tile unit can be repositioned in a first direction that is parallel to the wall after fastening the tile unit to the mounting unit. The tile unit can then be repositioned in a second direction that is parallel to the wall and perpendicular to the first direction after fastening the tile unit to the mounting unit.

The method can also include fastening a different tile unit to the mounting unit with a different tile unit-fastening device. The different tile unit can be repositioned in a first direction that is parallel to the wall after fastening the different tile unit to the mounting unit. The different tile unit can also be repositioned in a second direction that is parallel to the wall and perpendicular to the first direction after fastening the different tile unit to the mounting unit.

The method can also include fastening a different mounting unit to the wall with a different wall-fastening device. Such a method can further include fastening a different tile unit to the different mounting unit with a different tile unit-fastening device. A spacing tool can be used to provide a location for fastening the different mounting unit to the wall.

Fastening the mounting unit to the wall with the wall-fastening device can occur after fastening the tile unit to the mounting unit with the tile unit-fastening device.

If desired, the method can also include unfastening the tile unit from the mounting unit. The unfastening can occur without damage to the tile unit and/or the mounting unit. The unfastening can also occur without damage to the wall.

After a tile unit has been unfastened, the tile unit can then be refastened to the mounting unit, if desired.

According to some embodiments of the present invention, a method of making a tile system includes forming a tile unit by incorporating a decorative tile into or onto a tile platform effective to securely hold the decorative tile in its respective position within or relative to the tile platform. In some situations, an adhesive can be used to securely hold the decorative tile to the polymeric framework.

The method of making the tile system can further include providing a fastening device on one or both of a mounting unit or the tile unit such that the fastening device is configured to engage at least a portion of the other of the mounting unit or the tile unit. The fastening device is the primary means used (in conjunction with a mounting unit) for affixing the tile unit to the wall. The design of the fastening device can be selected to either facilitate or to inhibit removal of the tile unit from the mounting unit.

Other aspects and features of embodiments of the present invention will become apparent to those of ordinary skill in the art, upon reviewing the following detailed description in conjunction with the accompanying figures.

BRIEF DESCRIPTION OF THE DRAWINGS

FIG. 12 is a schematic illustration of a tile unit repositioning feature incorporated into the receiving portion of a tile unit-fastening device according to some embodiments of the present invention.

FIG. 18 is a schematic illustration of the front and rear of a corner of the polymeric frame unit of FIG. 17.

DETAILED DESCRIPTION

Figure 1:
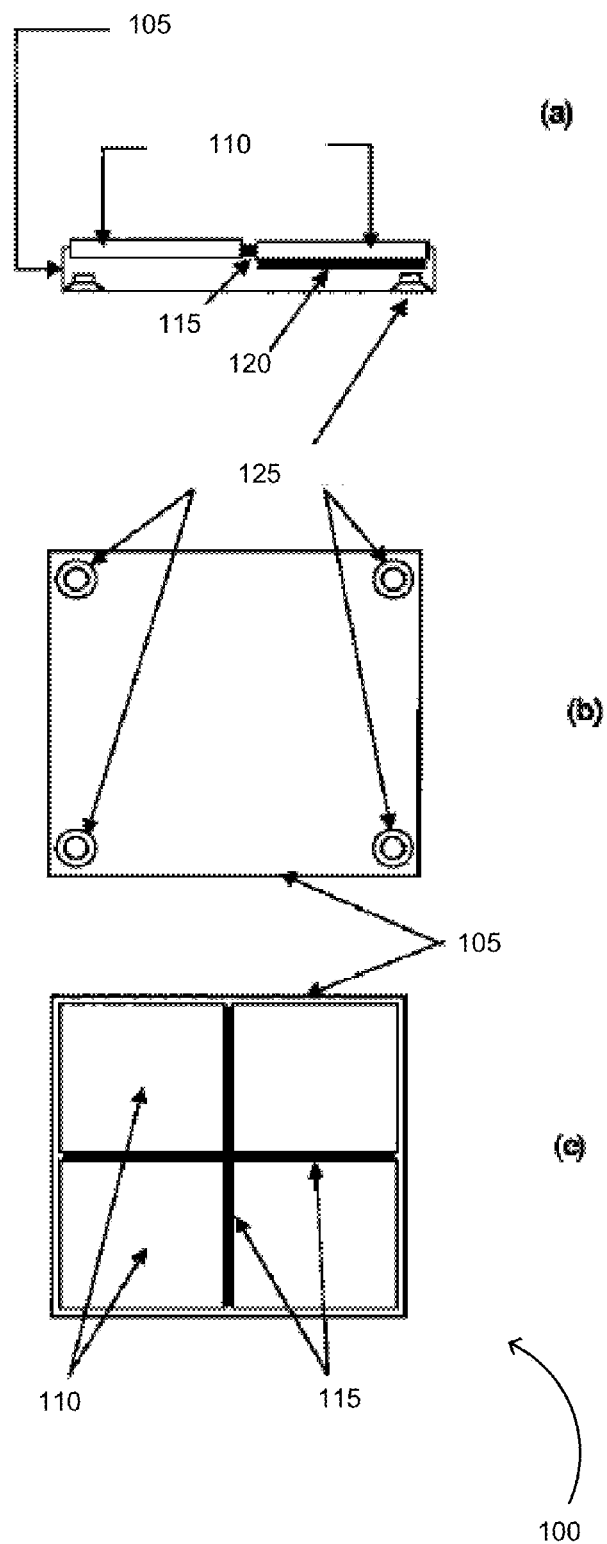
FIG. 1 is a schematic illustration of (a) a side cross-section, (b) a bottom view, and (c) a top view of a tile unit wherein the tile platform is a polymeric frame component according to some embodiments of the present invention.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Disclosed herein are decorative wall tile systems and methods of making and using the tile systems. The tile systems disclosed herein can provide increased ease of installation by eliminating the use of traditional cementitious fixatives that require numerous hours or even days to cure or set. In addition, the need for skilled labor to install the tile systems and/or apply a cementitious grouting material between adjacent tiles of a tile system in order to obtain an aesthetically pleasing result can also be eliminated. An optional feature associated with the tile systems is the provision of space between the tiles and the wall. In some instances, this space can be used to accommodate devices that can provide additional functionality to the tile systems, as will be described in greater detail below. In certain implementations, when it is desirable to remove any portion of the tile system from a wall, the portion can be removed relatively easily and without irreparably damaging any of the tiles, tile surfaces, or the surface to which the tiles have been mounted. In such cases, it is also possible for the removed portion, or another portion having the same dimensions and attachment mechanism(s), to be easily placed back into the position from which the portion was removed. Additional features and benefits of some or all of the embodiments of the present invention are further described below.

In general, the tile systems include a (i.e., at least one) tile unit and a mounting unit. As shown in FIG. 1, the tile unit generally comprises a decorative tile. By way of example, the decorative tile can be formed from a number of materials including ceramic, marble, granite, quartz, natural stone, porcelain, wood, glass, paper, a variety of metals or polymers, and the like.

The tile unit can also include a tile platform on which or in which the decorative tile is disposed. The tile platform can serve a number of purposes, including, for example, providing a level surface for the bottom of the tile unit, providing support to one or more decorative tiles within a given tile unit, facilitating mounting of the tile units to the wall, minimizing exposure of the sides of the decorative tiles after installation, and the like.

In some embodiments, the tile platform is a polymeric frame component that surrounds the decorative tile on five sides and forms the bottom of the tile unit. An example of a tile unit 100 that contains a polymeric frame component 105 as the tile platform is shown in FIG. 1. While the tile units 100 shown in FIGS. 1(a) and 1(c) indicate the respective use of two and four tiles of equal size, this is for illustrative convenience only. Any number of decorative tiles 110, having any composition, size, shape, color, or surface design/texture, can be used to form the tile unit. There is no requirement that the all of the tiles in the tile unit 100 be identical in composition, size, shape, color, surface design/texture, or the like. Thus, it should be clear to those skilled in the art to which this disclosure pertains that the tile unit 100 can range from having a single tile to a plurality of tiles in the form of a uniform repeating arrangement of identical tiles or even a mosaic of tiles having different compositions, shapes, sizes, colors, surface designs/textures, and the like.

The polymeric framework 105 encapsulates all but the decorative surface of the tiles 110, which includes the top surface and can include at least a portion of the sides of each decorative tile 110, as shown in FIG. 1(a). In some implementations, there is such a tight fit between the decorative tile 110 and the polymeric frame component 105 that no adhesive is necessary to secure the decorative tiles 110 in place. This is shown for the decorative tile 110 on the left-hand portion of the tile unit 100 in FIG. 1(a). In other implementations, the decorative tile 110 can be secured to the polymeric frame component 105 by an adhesive material 120, as shown for the decorative tile 110 on the right-hand portion of the tile unit in FIG. 1(a). In situations where an adhesive 120 is used, it is also possible for the adhesive 120 to be placed between adjacent decorative tiles 110 in the tile unit 100 to serve as a visible junction and/or seal therebetween. In some cases, as shown in FIGS. 1(a) and 1(c), instead of an adhesive being used between adjacent tiles in a given tile unit 100, a sealant material 115 can be used.

Regardless of the means of attachment, the decorative tiles 110 are generally placed within the polymeric frame 105 at the time of manufacture of the tile unit 100. That is not to say, however, that the various embodiments of the present invention are limited to having only the manufacturer of the polymeric frame unit incorporate the decorative tiles therein. It is possible, for example, in some situations for the installer to be able to place the decorative tiles of his or her choice in the polymeric framework if greater design choice is desired.

One primary function of the polymeric framework 105 is that it provides a frame wherein the decorative tiles 110, once incorporated into the framework 105, are securely held during and after installation on a wall. Thus, as long as at least this function is served, the structure of the polymeric framework 105 can be completely solid, as shown in FIG. 1(b), or it can have open areas on the bottom and sides to reduce the weight and material required to make the tile unit.

While the bottom and top views of the tile unit 100 shown, respectively, in FIGS. 1(b) and 1(c) indicate the use of a square polymeric framework 105, this too is for illustrative convenience only. In fact, the polymeric framework 105 can have any composition, shape, size, color, or the like. Though it may be more convenient for manufacturing, shipping, and/or installation purposes, there are situations where not all of the polymeric frameworks 105 (and, consequently, the tile units 100) in the tile system will be identical. Thus, it should be clear to those skilled in the art to which this disclosure pertains that the tile system can range from having a uniform repeating arrangement of identical polymeric frameworks (tile units) to a mosaic of tile units having different compositions, shapes, sizes, colors, and the like.

The polymeric frame 105 can be formed from any known polymeric material that can withstand the conditions (e.g., temperature swings, moisture, humidity levels, or the like) to which the tile system will be exposed. Examples of such polymer chemistries include, acrylonitrile-butadiene-styrene (ABS), polyethylene, polypropylene, polyurethane, nylon, recycled rubber tires (i.e., crumb rubber), and the like. In exemplary embodiments, the polymeric framework is molded or injection molded.

In some embodiments, the tile platform is a solid or porous board that forms at least the bottom of the tile unit. It is also possible for the solid or porous board, like the polymeric frame component, to encapsulate all but the decorative surface of the tiles (which includes the top surface and can include at least a portion of the sides of each decorative tile). For convenience, reference will now be made to an example of a tile unit 200 that contains a porous board 205 as the tile platform, such as that shown in FIG. 2. In this illustrative example, the porous board 205 only contacts the decorative tiles 110 on their bottom surfaces. That is, the porous board 205 does not encapsulate all but the decorative surface of the tiles 110. While the tile units 200 shown in FIGS. 2(a) and 2(c) indicate the respective use of two and four tiles of equal size, this is for illustrative convenience only. Any number of decorative tiles, having any composition, size, shape, color, or surface design/texture, can be used to form the tile unit 200. There is no requirement that the all of the tiles in the tile unit 200 be identical in composition, size, shape, color, surface design/texture, or the like. Thus, it should be clear to those skilled in the art to which this disclosure pertains that the tile unit 200 can range from having a single tile to a plurality of tiles in the form of a uniform repeating arrangement of identical tiles or even a mosaic of tiles having different compositions, shapes, sizes, colors, surface designs/textures, and the like.

Figure 2:
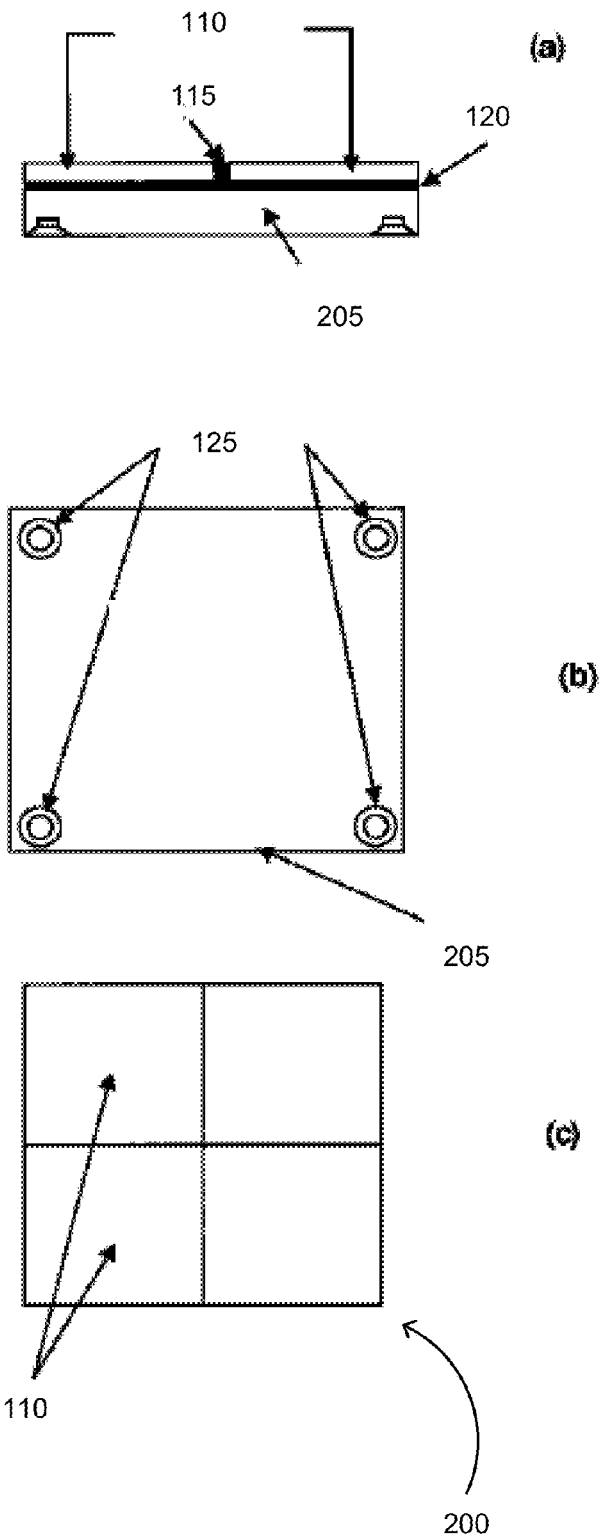
FIG. 2 a schematic illustration of (a) a side cross-section, (b) a bottom view, and (c) a top view of a tile unit wherein the tile platform is a porous board according to some embodiments of the present invention.

The porous board 205 provides a lightweight and strong support for the decorative tiles 110. The decorative tiles 110 are generally secured to the porous board 205 via an adhesive material 120, as shown for the decorative tiles 110 of the tile unit 200 in FIG. 2(a). In some situations, it is also possible for the adhesive to be placed between adjacent decorative tiles in the tile unit to serve as a visible junction and/or seal therebetween. In some cases, as shown in FIG. 2 (a), instead of an adhesive being used between adjacent tiles 110 in a given tile unit 200, a sealant material 115 can be used. Alternatively, as shown in FIG. 2(c), the edges of the decorative tiles 110 within a tile unit 200 can be mated together so that no sealant, adhesive, grout, or other material is necessary.

The decorative tiles 110 are generally placed on the porous board 205 at the time of manufacture of the tile unit. That is not to say, however, that the various embodiments of the present invention are limited to having only the manufacturer of the porous board 205 attach the decorative tiles thereto. It is possible, for example, in some situations for the installer to be able to affix the decorative tiles 110 of his or her choice on the porous board 205 if greater design choice is desired.

As stated above, one function of the porous board 205 is that it provides a support on which the decorative tiles 110, once affixed thereto, are securely held during and after installation on a wall. Thus, as long as at least this function is served, the structure of the porous board 205 can be completely solid, as shown in FIG. 2(b), or it can have open areas on the bottom and sides to reduce the weight and material required to make the tile unit 200.

While the bottom and top views of the tile unit 200 shown, respectively, in FIGS. 2(b) and 2(c) indicate the use of a square porous board 205, this too is for illustrative convenience only. In fact, the porous board 205 can have any composition, shape, size, color, or the like. Though it may be more convenient for manufacturing, shipping, and/or installation purposes, there are situations where not all of the porous boards (and, consequently, the tile units) in the tile system will be identical. Thus, it should be clear to those skilled in the art to which this disclosure pertains that the tile system can range from having a uniform repeating arrangement of identical porous boards 205 (tile units) to a mosaic of tile units having different compositions, shapes, sizes, colors, and the like.

As stated above, the board can be solid or porous. The solid board can be formed from any known polymeric material that can withstand the conditions (e.g., temperature swings, moisture, humidity levels, or the like) to which the tile system will be exposed, including those described above for the polymeric frame component. Alternatively, the solid board can be formed from sheet metal, wood, particle board, and the like. The porous board can be formed from many of the polymeric materials that can be used to make a solid board, but with a foaming agent included in the casting, molding or extrusion process. The porous board can have closed cell or open cell pores. Exemplary porous board materials include expanded closed cell polystyrene and polyurethane foam boards. Alternatively, the porous board can be formed from wood products, minerals, inorganic substances, and the like.

The tile unit is secured to the wall through a mounting unit that is configured to engage the tile unit via a fastening device. It is the mounting unit that is attached to the surface of the wall, thus providing a means of indirectly securing the tile unit to the wall in a convenient and efficient manner. The mounting unit generally includes a base plate or base unit that is configured to be fixedly (but not necessarily permanently) attached to the wall via a fastening device, which can be the same as, or different than, the fastening device used to engage the tile unit with the mounting unit. The base unit includes means for attachment of both types of fastening devices, hereinbelow termed "wall-fastening devices" and "tile unit-fastening devices" for descriptive convenience and clarity.

The base unit of the mounting unit can be any type of structure, having any composition, size, shape, thickness, fastener number capacity, or fastener orientation. In fact, there is no requirement that all of the mounting unit base plates be identical in composition, size, shape, thickness, fastener number capacity, fastener orientation, or the like. It should be clear to those skilled in the art to which this disclosure pertains that the tile system can range from having identical mounting units to an assortment of mounting units having different compositions, sizes, shapes, thicknesses, fastener number capacity, fastener orientations, and the like.

The base plate of the mounting unit can be formed from any known material that can withstand the conditions to which the tile system will be exposed. Examples of such materials include wood, metals, polymers, and the like. As will be described in more detail below, the thickness of the base plate can vary depending on the desired proximity between the tile unit and the surface of the wall.

Figure 3:
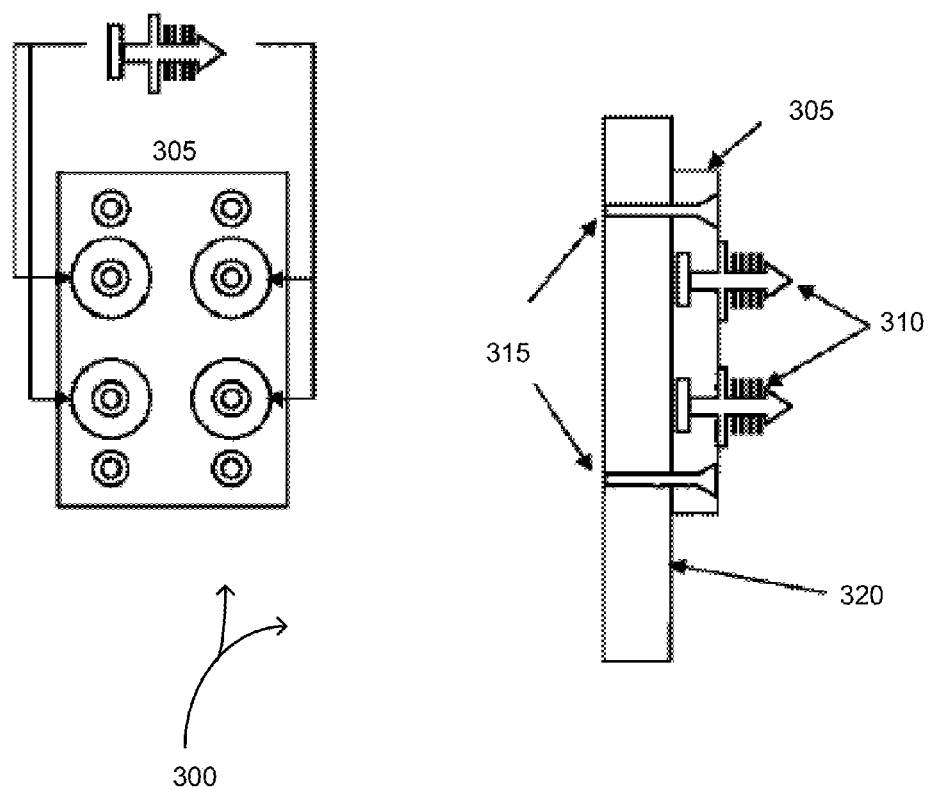
FIG. 3 is a schematic illustration of a mounting unit with a rectangular block as the base unit according to some embodiments of the present invention.

In some embodiments, the base plate 300 of the mounting unit 305 is a rectangular block, as shown in FIG. 3. The cross-sectional and top views of the mounting unit shown in FIG. 3 indicate that the outer portion of the base plate 300 is intended for the wall-fastening devices 315 and the inner portion of the base plate is intended for the tile unit-fastening devices 310. This, however, is for illustrative convenience only. There is no limitation on the location of the wall-fastening devices 315 and the tile unit-fastening devices 310 on a given mounting unit 305. In addition, as will be described below, the mounting unit 305 may not necessarily include a place for the tile unit-fastening devices 310, but can include a place to position a device for engaging the tile unit-fastening devices 310.

In other embodiments, the base plate of the mounting unit is a rail-like structure. The rail-like structure can be mounted vertically or horizontally on the wall. In embodiments where a design space (which is described in more detail below) is desired, the rail-like structure cannot be mounted both horizontally and vertically if the rails extend from one end of the wall or to the other, or from floor to ceiling, respectively.

Figure 4:
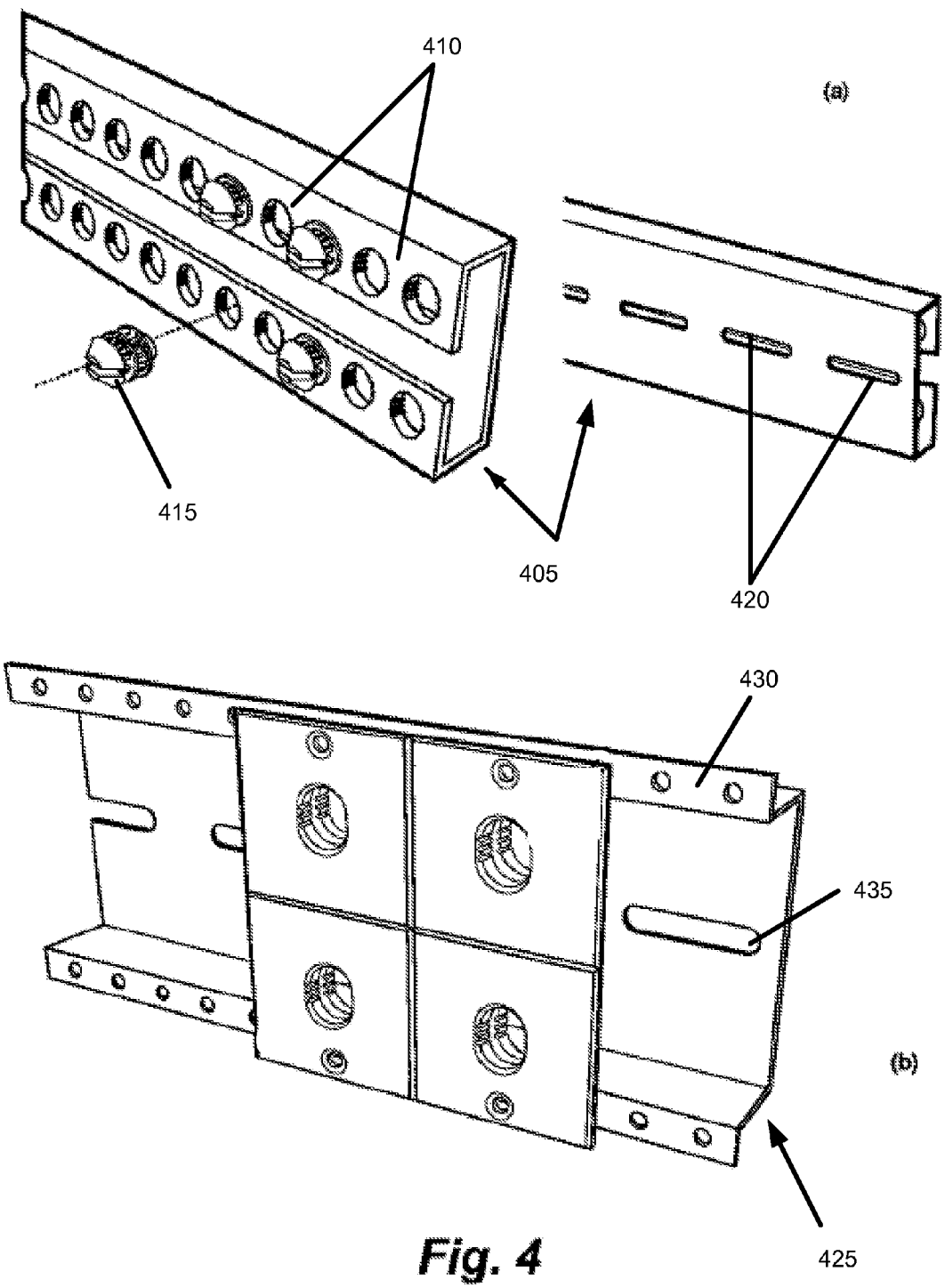
FIGS. 4(a) and (b) include schematic illustrations of mounting units with rail-like structures as the base unit according to some embodiments of the present invention.

Two illustrative examples of rail-like structures are shown in FIG. 4. FIG. 4(a) provides the front and back views of a rail-like structure 405 in which the rail itself contains openings for engaging a portion of a tile unit-fastening device. The rail-like structure has a so-called c-shaped cross-section, wherein the front of the "c" 410 is intended for the tile unit-fastening devices 415 and the back of the "c" provides slots 420 for wall-fastening devices. In contrast, the rail-like structure 425 in FIG. 4(b) has a so-called square omega shaped cross section, wherein the top of the square "omega" 430 is intended for the wall-fastening devices and the bottom of the square "omega" provides slots 435 for coupling the tile unit-fastening devices (or a device to engage the tile unit-fastening devices) to the rail. The rail-like structures shown in FIG. 4 provide a large number of positions where the tile unit-fastening devices can be placed. This affords great flexibility in allowing tile units of different sizes, shapes, and orientations to be mounted thereto.

The number, orientation, and type of fastening device will be selected based on the application. General factors to be considered include the construction of the wall and any items (e.g., studs, plumbing, electrical wires, and the like) behind it, the weight of each tile unit, the conditions to which the surrounding area will be exposed, and the like. Any of a number of wall-fastening devices can be used to secure the mounting unit to the wall. Examples of such wall-fastening devices include screws, nails, staples, double-sided adhesive tape or pads, hook-and-loop fasteners, and the like. Similarly, any of a number of tile unit-fastening devices can be used to engage the tile unit to the mounting unit. Exemplary tile unit-fastening devices include metal or plastic push-on fasteners or hooks, which employ a latching mechanism, and adhesive-like devices (e.g., double-sided adhesive tape or pads), hook-and-loop fasteners, and the like. It should be noted that, in some embodiments, the wall-fastening device and the tile unit-fastening device can be the same device. In these situations, the need for two different types of fastening devices is eliminated.

In some cases, one or both type of fastening devices can be integrated into the tile unit, mounting unit, or both. One example includes a mounting unit made, via injection molding, with push-on fasteners integral to the base plate. Another example includes a tile unit made, via injection molding, with snap-on fasteners integral to the tile platform.

The tile unit-fastening devices can be oriented such that they extend from the mounting unit in a direction opposite from the surface of the wall (with the tile unit providing a corresponding receiving portion for engagement), extend from the tile unit in a direction opposite from the decorative tiles (with the mounting unit providing a corresponding receiving portion for engagement), or some combination of both.

One example of the tile unit-fastening devices 310 extending from the mounting unit is shown in FIG. 3, with the corresponding receiving portion 125 for engagement of the tile unit-fastening devices shown in FIGS. 1 and 2. In such cases, the base plate of the mounting unit 305 serves as a host for the tile unit-fastening devices 310. The tile unit-fastening devices 310 can be attached to the mounting unit 305 by any means possible. For example, as shown in FIG. 3, the tile unit-fastening devices 310 can be placed into slots or notches cut into the base plate. Alternatively, one portion of a tile unit-fastening device 310 can be screwed into the base plate 300 with the portion thereof that is configured to engage the tile unit extending outwardly from the base plate 300. In other situations, as alluded to above, the tile-unit fastening devices 310 can be made as an integral part of the mounting unit 305, for example, by molding a single piece containing both the mounting unit 305 and the tile unit-fastening devices 310. While the tile unit-fastening devices 310 shown in FIG. 3 are push-on fasteners, it should be clear that this is for illustrative convenience only and that any suitable tile unit-fastening device can be implemented.

To facilitate engagement between such a mounting unit and the tile unit, the tile unit includes a receiving/engaging portion for the tile unit-fastening device. For example, on the backside of the tile unit shown in FIGS. 1(a) and (b) as well as FIGS. 2(a) and (b), the tile platform (i.e., the polymeric frame component and the porous board, respectively) includes a series of recessed mounting points. The mounting points are recessed to accept at least a portion of the tile unit-fastening devices, which protrude from the base plate of the mounting unit. One benefit of the mounting points being recessed is that the tile unit can maintain a planar geometry on its front and back surfaces, which can be beneficial for packaging the tile units for shipping and storage, thereby optimizing energy and space requirements. This benefit can also be derived by the mounting units if the tile unit-fastening devices are attached to the mounting unit on-site (i.e., at the time of installation, rather than at the time of manufacture).

Figure 5:
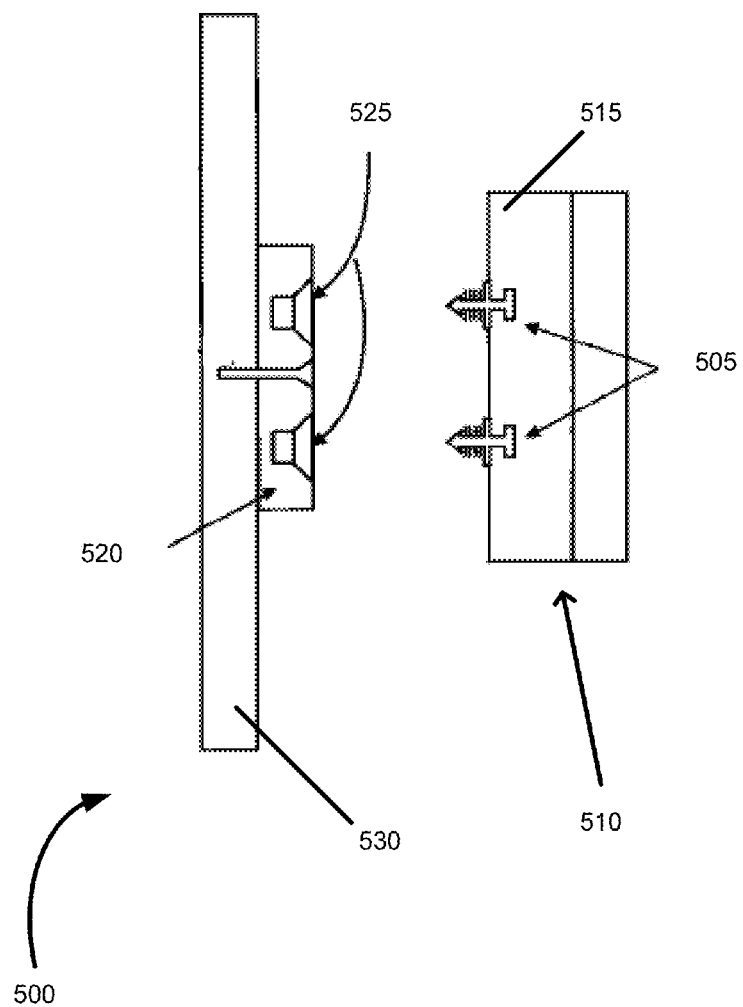
FIG. 5 is a schematic illustration of a tile unit and mounting unit according to some embodiments of the present invention.

In contrast to the design of FIGS. 1 through 3, the fastening devices can extend from the tile units. In these embodiments, an example of which is shown in FIG. 5, the tile platform 515 of the tile unit 500 serves as a host for the tile unit-fastening devices 505. The tile unit-fastening devices 505 can be attached to the tile platform 515 by any means possible. For example, the tile unit-fastening devices 505 can be placed into slots or notches formed in the tile platform 515. Alternatively, one portion of a tile unit-fastening device 505 can be screwed into the tile platform 515 with the portion thereof that is configured to engage the mounting unit 520 extending outwardly from the tile platform 515. When threading the tile unit-fastening device 505 into the tile platform 515, care must be taken to avoid damaging the decorative tile. In other situations, the tile-unit fastening devices 505 can be made as an integral part of the tile platform 515, for example, by molding a single piece containing both the tile platform and the tile unit-fastening devices.

In these embodiments, to facilitate engagement between the mounting unit 520 and the tile unit 500, the mounting unit 520 includes a receiving/engaging portion 525 for the tile unit-fastening device 505, as shown in FIG. 5. For example, when push-on type fastening devices are used, there could be a series of recessed mounting points on the base plate of the mounting unit. The mounting points 525 are recessed to accept at least a portion of the tile unit-fastening devices 505, which protrude from the base plate 530 of the mounting unit 520. Here, the benefit of maintaining a planar geometry for packaging is derived by the mounting units. Such benefits can also be derived by the tile units if the tile unit-fastening devices are attached to the tile unit on-site.

Figure 6:
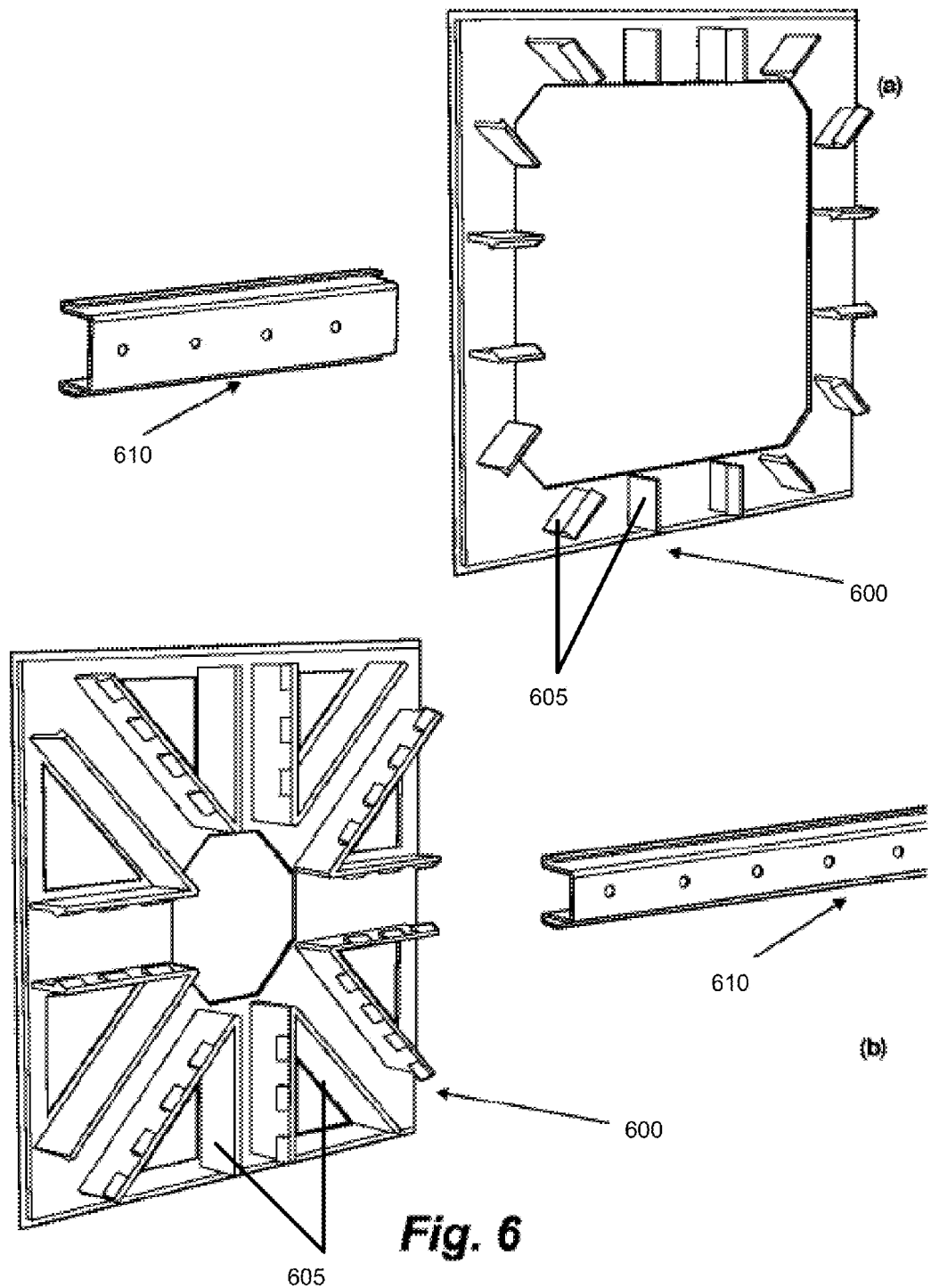
FIGS. 6(a) and (b) include schematic illustrations of tile units and mounting units according to some embodiments of the present invention.

Other examples of the tile unit-fastening devices extending from the tile unit 600 are shown in FIGS. 6(a) and (b). The corresponding portions for engagement of the tile unit-fastening devices in these examples are on the mounting units 610, the base plates of which are rail-like structures. The tile unit-fastening devices 605 slide over the side arms of the c-shaped rail-like structures and snap thereon. Both tile units 600 in FIGS. 6(a) and (b) have more than one tile unit-fastening device 605 extending therefrom. That is, there are four tile unit-fastening devices 605 on each tile unit to allow for vertical, horizontal or diagonal mounting of the tiles. The primary difference between the tile units of FIGS. 6(a) and (b) is that the snapping devices of the former are at discrete locations, while the snapping devices of the latter are extended over a distance to create snapping "channels" that provide greater stability if needed. In both examples shown in FIG. 6, the tile unit-fastening devices 605 are integral to the tile platform of the tile unit 600. This can be achieved, for example, by welding the tile unit-fastening devices onto the tile platform or by injection molding the entire tile unit as one piece.

Figure 7:
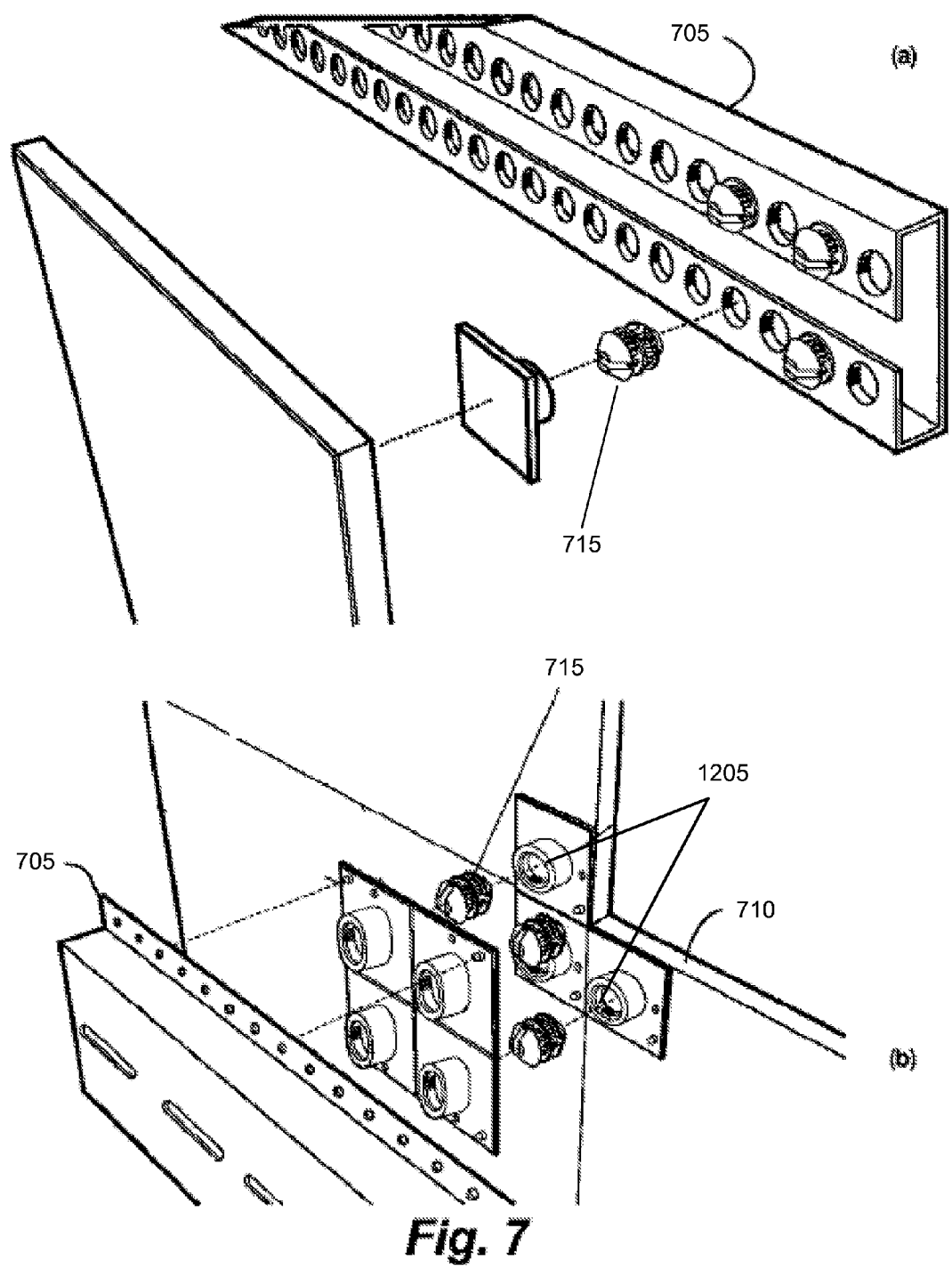
FIGS. 7(a) and (b) include schematic illustrations of tile units and mounting units according to some embodiments of the present invention.

In some implementations, both the mounting unit and the tile unit include a receiving/engaging portion for the tile unit-fastening device, and the tile unit-fastening device can be placed in either of the receiving/engaging portions before coupling the tile unit to the mounting unit. The rail-like structures 405,425 used for the base units of the mounting units shown in FIG. 4 provide examples of such structures. FIGS. 7(a) and (b) illustrate that, in such cases, the mounting unit or the tile unit 710 can serve as a host for the tile unit-fastening devices 715. It should be noted that in these examples, the tile unit 710 includes the decorative tile without a tile platform, such that the receiving/engaging portion for the tile unit-fastening device that is included as part of the tile unit is affixed directly to the decorative tile itself. If a tile platform were used, the receiving/engaging portion for the tile unit-fastening device that is included as part of the tile unit would be affixed to the tile platform.

Figure 8:
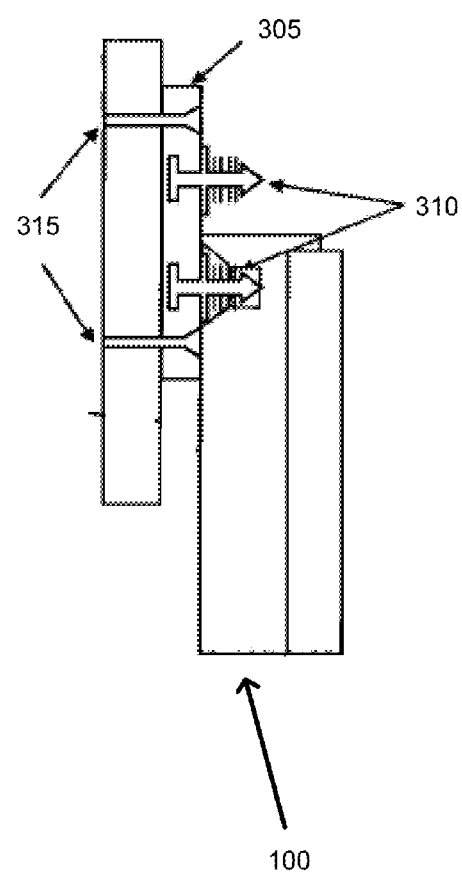
FIG. 8 is a schematic illustration of the tile unit of FIG. 1 engaged with the mounting unit of FIG. 3 according to some embodiments of the present invention.
Figure 9:
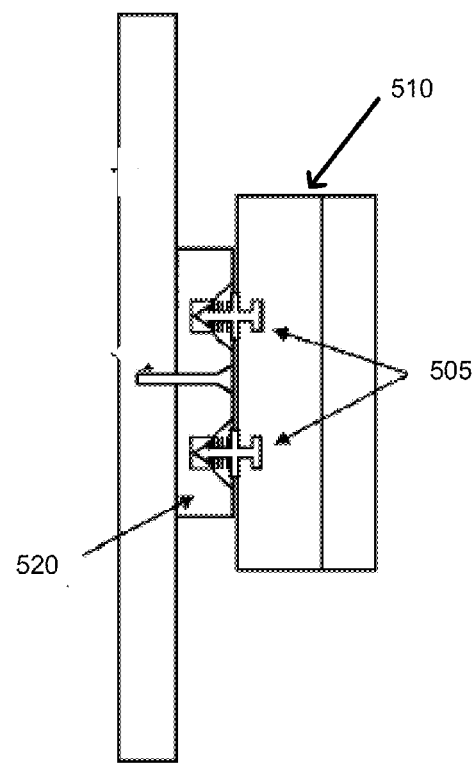
FIG. 9 is a schematic illustration of the tile unit of FIG. 5 engaged with the mounting unit of FIG. 5 according to some embodiments of the present invention.
Figure 10:
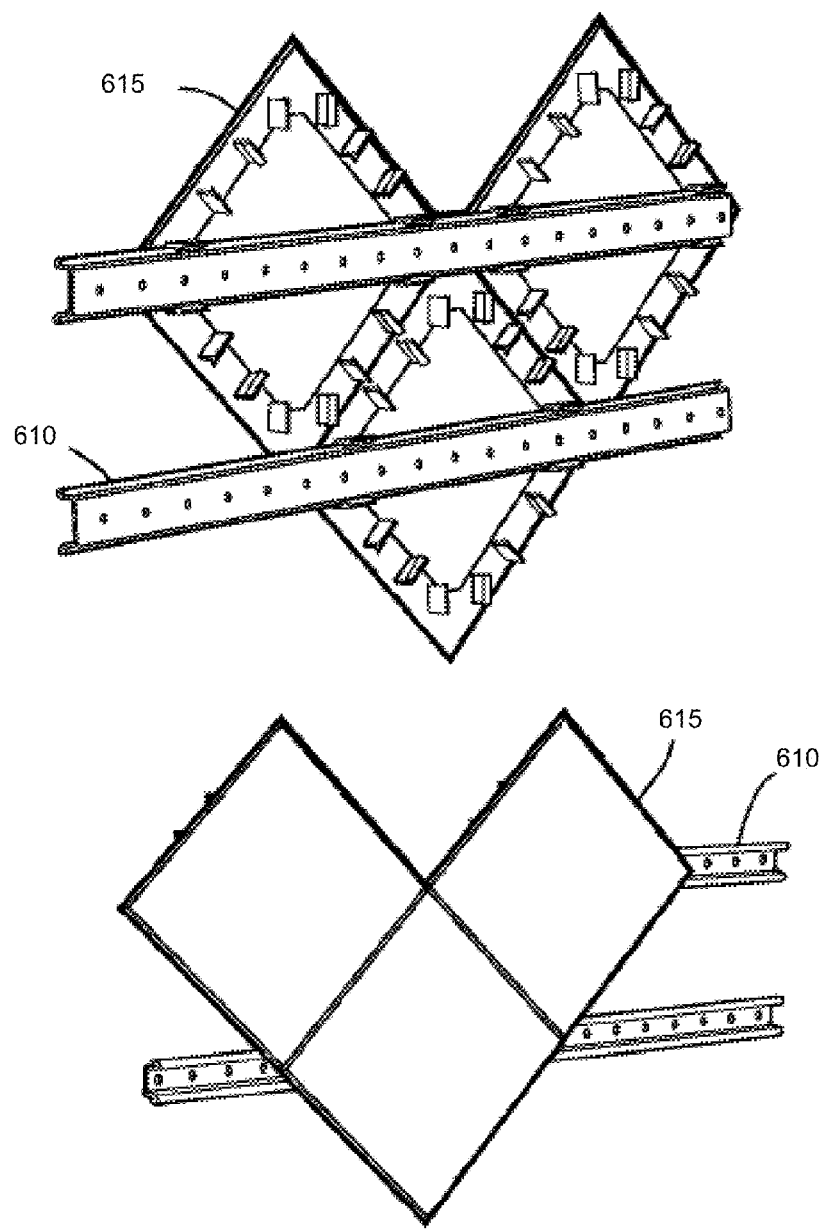
FIG. 10 is a schematic illustration of the tile unit of FIG. 6(a) engaged with the mounting unit of FIG. 6(a) according to some embodiments of the present invention.

Regardless of whether the tile units, mounting units, or both have the tile unit-fastening devices protruding therefrom, the tile units are generally engaged with the mounting units by contacting the tile unit with the mounting plate such that the protrusions from the tile unit-fastening devices match the receiving/engaging portions of the other component. By way of illustration, FIG. 8 depicts the tile unit 100 of FIG. 1 engaged with the mounting unit 305 of FIG. 3, FIG. 9 depicts the engagement of the tile unit 500 and mounting unit 520 of FIG. 5, and FIG. 10 depicts front and rear views of the engagement of the tile unit 615 and mounting unit 610 of FIG. 6(a).

In some cases, depending on the type of tile-unit fastening device used, contacting the tile unit with the mounting plate can involve pushing the tile unit onto the mounting unit. In other cases, particularly where the tile unit-fastening device has a hook or hook-like shape (e.g., such as in the snap-on fasteners used in FIG. 6), contacting the tile unit with the mounting plate can (but does not necessarily) involve angling the tile unit onto the mounting unit to facilitate catching the protrusion(s) of the tile unit-fastening devices on the receiving/engaging portions of the other component.

Before the tile units can be engaged with the mounting units, the mounting units are first placed on the wall in specific locations, which generally correspond to the geometry and design of the tile units. The placement of the mounting units is important because the location of the receiving/engaging portions of the tile units or the mounting units must match the fastener structures protruding from the other of the tile units or the mounting units.

Proper positioning of the mounting units can be accomplished by a number of relatively simple methods. In two examples, shown in FIGS. 11(a) and (b), the installer can use an installation spacing template 1105 or right-angle tool that enables him or her to exactly position the mounting units 1120 at the necessary spacing to match the geometry of the tile units 1115. Then, once the mounting units 1120 have been installed properly, the spacer can be removed and the tile units 1115 can be engaged with the mounting units 1120.

Figure 11:
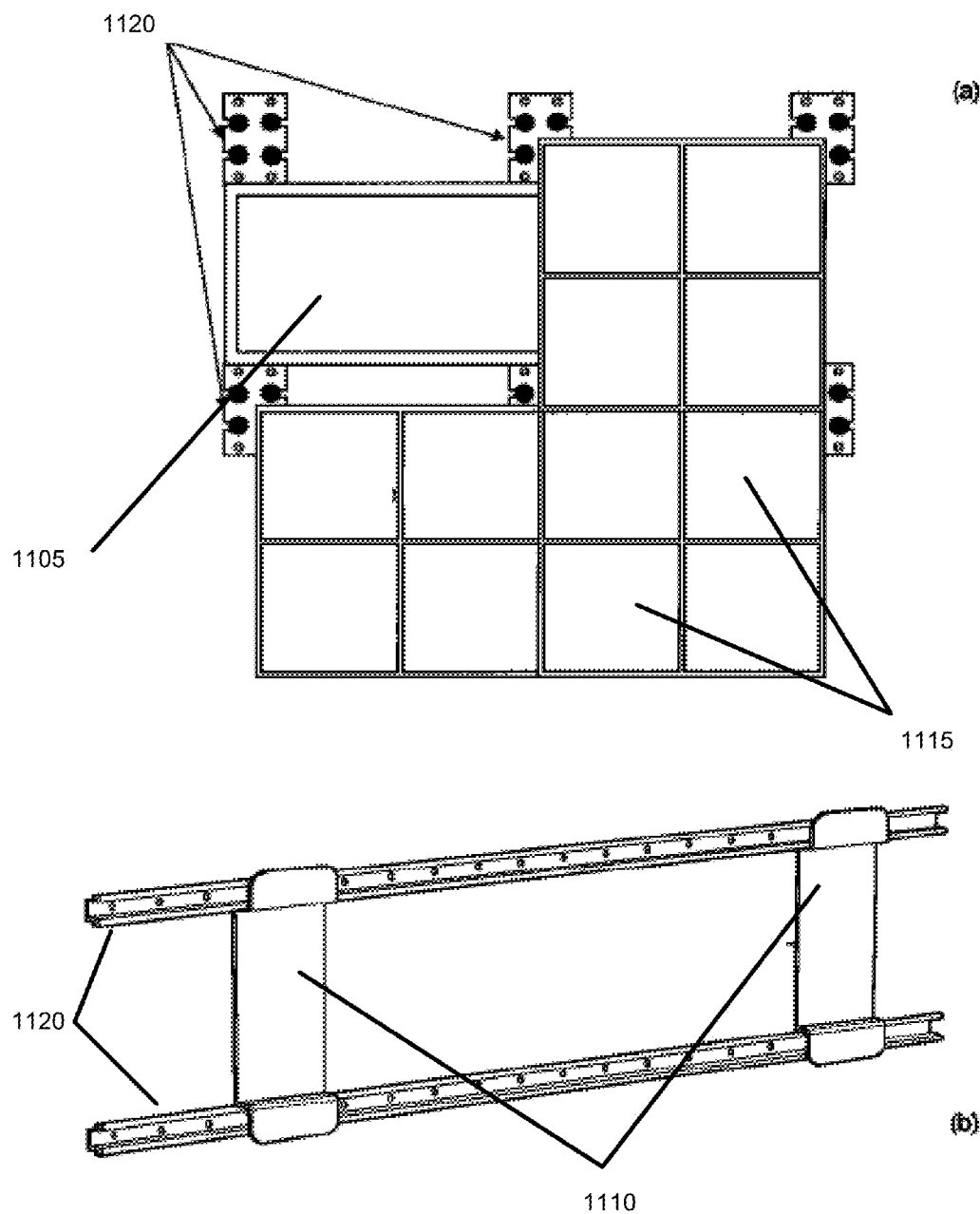
FIGS. 11(a) and (b) include schematic illustrations of the use of spacers for installing a tile system on a wall surface according to some embodiments of the present invention.

The installation scheme shown in FIG. 11(a) indicates that the tile units 1115 are engaged at their corners, with the mounting units 1120 being shared between multiple tile units 1115 (as shown from a side perspective in FIG. 8); this, however, is for illustrative convenience only. The tile units 1115 can be engaged with the mounting units 1120 at any location, as long as the weight of the tile unit 1115 can be supported by the engagement of all tile unit-fastening devices with all receiving portions for a particular tile unit. Similarly, each mounting unit 1120 can be designed to support a single tile unit or more than one tile unit. For example, in some instances, a mounting unit can be placed in the center of a tile unit such that all of the tile unit-fastening devices for that particular mounting unit engage with only one tile unit (as shown from a side perspective in FIG. 9). Thus, it should be clear to those skilled in the art to which this disclosure pertains that, at a minimum, each mounting unit can be used to at least partially support at least one tile unit.

FIG. 11(b) shows how a spacer tool 1110 can be used to position mounting units 1120 that employ rail-like structures. Once the individual rails are positioned properly, the spacer tool can be removed and the tile units can be engaged with the mounting units.

A second example of a method for positioning the mounting units (and the tile units) can involve the installer first engaging a single tile unit with the requisite number of mounting units to engage that tile unit. Once the tile unit has been engaged with the mounting units, the installer can secure those engaged mounting units to the wall using the appropriate wall-fastening devices. The installer, having established the relative positioning for those mounting units, can then engage an adjacent tile unit to the already-secured mounting units along with any additional mounting units that are required to completely engage that tile unit. Next, the additional mounting units can be secured to the wall. This process can be repeated for each tile unit that is to be installed on the wall.

To illustrate this method, reference will be made to the installation scheme shown in FIG. 11(a) without inclusion of the spacer tool. Here, the installer will first position four mounting units 1120 in such a manner as to engage a single tile unit 1115 at each corner. The tile unit 1115 is then engaged with the four mounting units 1120. Once the relative positions of these four mounting units 1120 has been established, the installer can then affix these four mounting units 1120 to the wall using the requisite wall-fastening devices. Taking the next tile unit 1115 (i.e., a tile unit that will be positioned adjacent to the already-mounted tile unit), the installer could engage it to two more mounting units 1120 on a side that is opposite to one where this tile unit 1115 will engage the two mounting units 1120 that are already secured to the wall. This tile unit 1115 can then be engaged with the two already-secured mounting units 1120. The two mounting units 1120 that have not already been secured to the wall can now be secured using the requisite wall-fastening devices. Next, another tile 1115 can be engaged with a new set of two mounting units 1120. Once this tile 1115 has been engaged with two previously-secured mounting units 1120, the new set of two mounting units 1120 can be secured to the wall. This process will be repeated until each tile unit 1120 is installed on the wall. In some cases, only one new mounting unit will be necessary (e.g., when going across a row where the row underneath that particular tile unit has been installed); and, in a few cases, no new mounting units will be necessary to install a particular tile unit using this method.

Regardless of the method chosen, the tile units can be secured to a wall surface quickly, properly, and with significantly less time than needed to install traditional wall tile. This is due, in part, to the elimination of the need for thin-set cements or other adhesives to adhere the tile to the wall during installation. In addition, the need for grouting materials can be eliminated if the tile units are engaged with the mounting units in such a manner as to abut one another.

For conventional wall tile installations, the tiles can be repositioned after the tile is initially and temporarily affixed to the wall using a cementitious thin-set or polymeric mastic, which are sufficiently uncured. Once cured, such adhesives are permanent, non-deformable, and do not permit any repositioning of the decorative tile. One skilled in the art of conventional decorative tile installation can readily appreciate that such repositioning steps are commonly used to effect the most attractive installation using decorative tile whose overall dimensions may vary slightly.

With respect to the tile systems described herein, the ability to reposition a tile unit after it is initially mounted to a mounting unit is just as desirable, for similar reasons. Thus, a mechanical means to allow slight adjustments parallel to the plane of the wall (i.e., in the x-y plane, where the z-direction is defined as being perpendicular to wall) is also provided herein.

This feature permits the use of non-rectified tiles having the degree of dimensional variation commonly encountered in the industry. The ability to make such adjustments is regulated so that the tile unit is securely held both to the wall and at a particular position in the x-y plane parallel to the wall. In other words, the tile unit will not be able to "float" freely in the x-y plane, but rather is able to be positioned securely at a number of defined x and y positions. This ability permits the installer to compensate for, or minimize, the visual effect of individual tile dimensional variations.

This repositioning feature is generally achieved in the design of the tile unit-fastening device and/or the engagement portion for engaging the tile unit-fastening device. One example where the repositioning feature is incorporated into the engagement portion is shown in FIG. 4(b). As seen in FIG. 4(b), the engagement portion for receiving the tile unit-fastening device has an oval shape. Perpendicular to the long axis of the oval, there are notches along the outer edge of the oval. These notches, coupled with the oval shape of the receiving portion, permit slight movement of the tile unit-fastening device along the long axis of the oval once the tile unit-fastening device has been engaged. Thus, this type of receiving portion permits movement in either the x- or y-direction depending on the orientation of the oval, as shown in more detail in FIG. 12.

Figure 13:
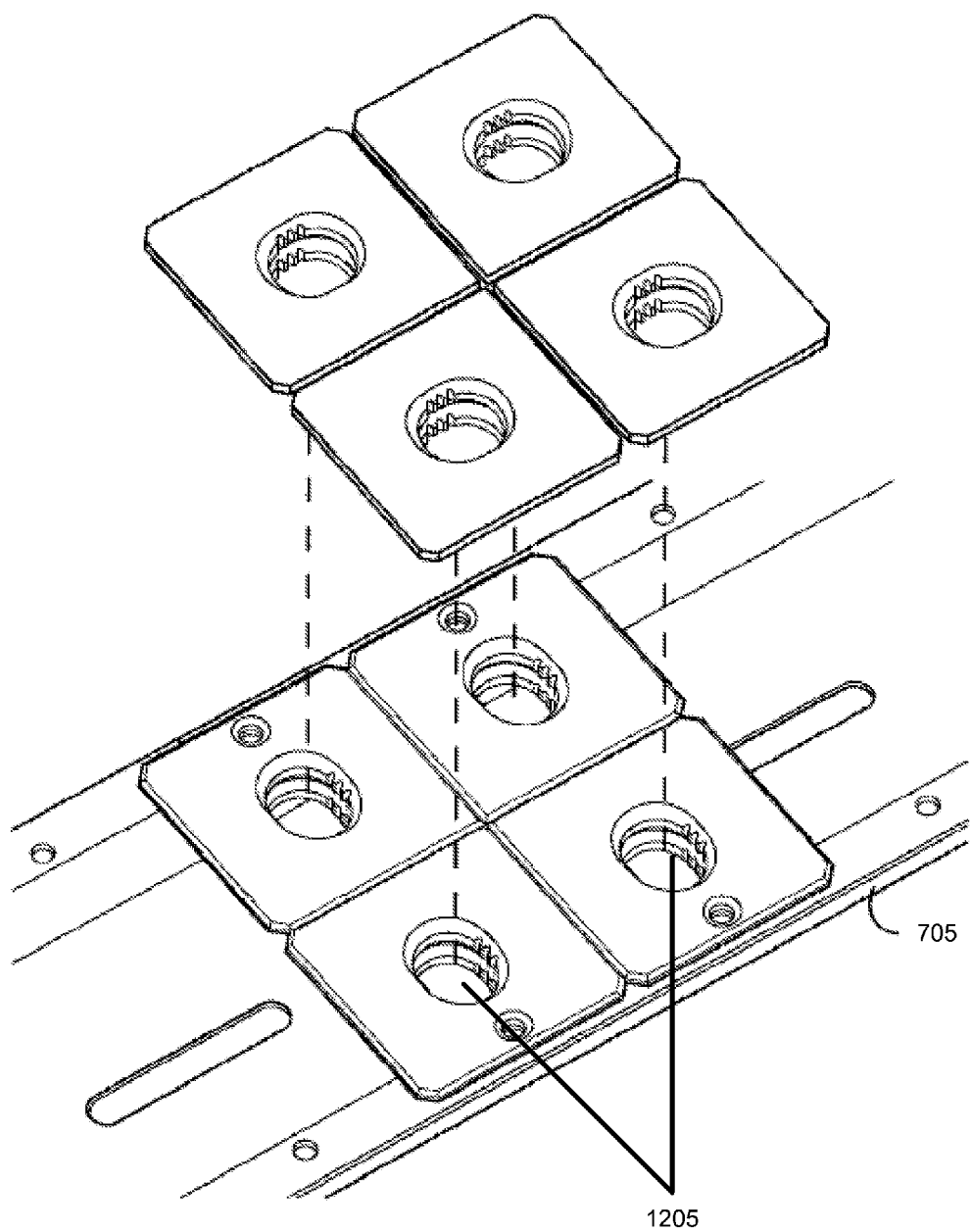
FIG. 13 is a schematic illustration of the mechanism for the repositioning feature shown in FIG. 12 according to some embodiments of the present invention.

Continuing with reference to FIG. 12, if two such receiving portions 1205 are used, along with a tile unit-fastening device that engages both receiving portions 1205, as described above and shown in FIGS. 7(a) and (b), then both x- and y-direction repositioning is permitted. The only requirement is that the long axis of each oval-shaped receiving portion 1205 is perpendicular to the other. For example, the receiving portion 1205 shown on the left-hand side of FIG. 12 can be affixed to a mounting unit having a rail-like structure in the orientation shown therein, while the receiving portion shown 1205 on the right-hand side of FIG. 12 can be affixed to a tile unit in the orientation shown therein. A close-up illustration of the orientation of the two receiving portions 1205 with respect to each other can be seen in FIG. 13. A perspective view of the orientation of the two receiving portions 1205 with respect to each other can also been seen in FIG. 7(b).

Figure 14:
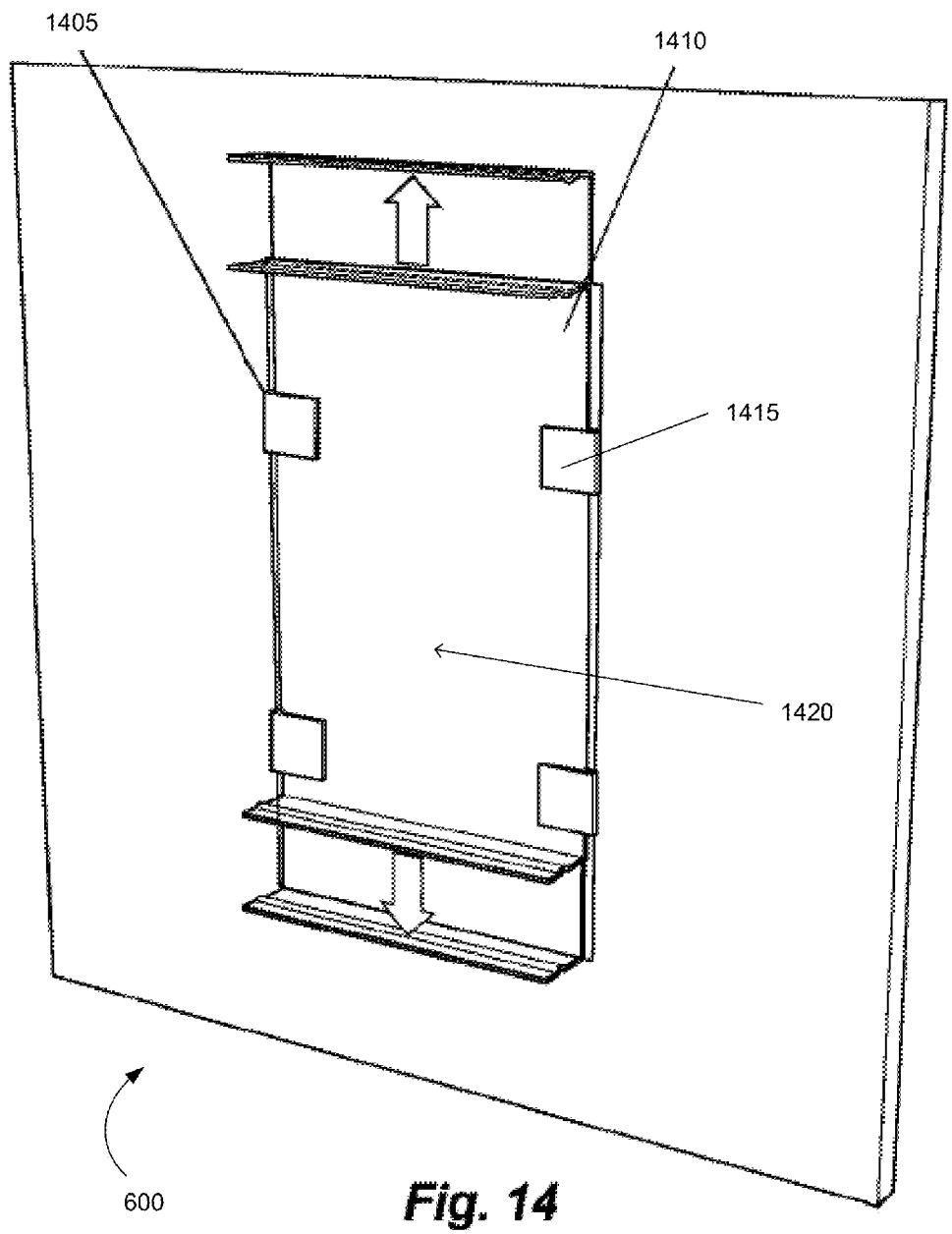
FIG. 14 is a schematic illustration of a tile unit repositioning feature incorporated into a tile unit-fastening device according to some embodiments of the present invention.

In contrast, an example where the repositioning feature is incorporated into the tile unit-fastening device is shown in FIG. 14. This example makes use of a tile unit-fastening device similar in action to those shown in FIGS. 6(a) and (b). Specifically, in those cases, the tile unit-fastening device is integrated into, or directly affixed to the tile unit 600. In the tile unit 600 shown in FIG. 14, the tile unit-fastening device 1420 is indirectly affixed to the tile unit 600. That is, a bottom plate 1405 is affixed to the tile unit 600, and a top plate 1410, which has the snap-type fastening mechanism, is affixed to the bottom plate 1405 in a manner that allows movement of the top plate 1410 with respect to the bottom plate 1405. In the example shown in FIG. 14, the top plate 1410 is clamped down to the bottom plate 1405 using tab-like devices 1415 that provide enough force to hold the top plate 1410 in place while still allowing the top plate 1410 to slide in one direction. When the snap-type fastening mechanism of the tile unit 600 is mounted, for example, to a rail-like structure similar to that described above and shown in FIGS. 6(a) and (b), movement in a direction perpendicular to that afforded by the top plate/bottom plate movement is enabled along the direction of the rail. Thus, both x- and y-direction repositioning is achieved.

For certain applications, the appearance of the tile platform between the tile units may be aesthetically pleasing, thus eliminating the need for any further installation steps. If desired, however, the top surface of the joint where adjacent tile units abut optionally can be covered or sealed together to improve the aesthetic appearance and/or resistance to liquid penetration. The seal can be created using any of a number of flexible or semi-rigid, non-cementitious materials as understood by those skilled in the art to which this disclosure pertains and/or as will be described in more detail below.

One optional additional feature that can be incorporated into the tile systems is the ability to provide a gap or design space between the tile units and the wall surface. As seen in FIGS. 8 and 9, there is a gap formed between the tile unit and the surface of the wall. Depending on the total volume of space allotted for it, the design space can be used to offer enhanced functionality to the tile systems. More specifically, the design space can provide an unobtrusive, accessible, and re-configurable location for items such as electrical wiring, plumbing, thermal insulation, sound insulation, and/or specialized devices that will enable enhanced functions for the installed wall. Examples of such items include cameras, speakers, signs, placards, artwork, mirrors, flat panel television displays, computer displays, lights, photovoltaic (PV) cells, thermoelectric (TE) devices, electrical heaters, antennas, or the like. These items can be completely hidden from view, or they can be visible so as to attract attention or interaction therewith.

By way of example, one or more tile units can be arranged such that a gap exists between them. A camera, for security or other purposes, can be placed in the gap between the tile units. If the gap and the lens of the camera are small enough, the camera may not be visible. Likewise, if the decorative tile is sufficiently transparent to the operating spectrum of a camera, the camera can be completely hidden behind the decorative tile, and the space between the tile unit and wall serves to allow the easy provision of power to and data from the camera. In other situations, a larger item (e.g., speaker, sign, placard, artwork, minor, flat panel television display, computer display, solar cell, or the like) can be placed in the gap between adjacent tile units. Any wiring or mounting equipment can be placed directly behind the item and/or can be hidden by the surrounding tile units. These items can be mounted to be flush with tile units that surround them, or they extend from the walls beyond the surface of the tile units.

As another example, a PV cell or TE device can be placed directly behind one or more tile units. Alternatively, the PV or TE device could take the form similar to that of a decorative tile, and the polymeric frame could then hold the device, with any requisite wiring being contained out of sight in the gap behind the tile unit. In the case of PV cells, the decorative tile and/or the polymeric frame compositions can be selected such that they are transparent to the specific type of light that is desired to be captured by the PV cell. The desired light (e.g., light from an indoor lamp, the sun, or any other light source) can then be harnessed by the PV cell to store and produce electrical energy, which can be used to power any electrical items that are installed on the same wall or elsewhere. Alternatively, the electrical energy can be stored or transferred for future use.

In the case of TE devices, both the electrical energy-generating and heat-transferring capabilities can be used. For example, if a current is run through a thermoelectric device that is placed behind one or more tile units, heat can be absorbed or emitted from the thermoelectric device to cool or heat, respectively, the immediate surroundings. This feature can be used to provide radiant heating or cooling to the wall. Naturally, in such situations, the materials used to make the components of the tile system will be able to withstand the temperature gradients to which they will be exposed. In the opposite case, particularly if the wall is an external wall, any temperature gradients to which the thermoelectric unit is exposed can be used to generate electrical energy for use as described above with respect to the PV cells.

In certain embodiments, a PV cell can be coupled to a TE device to provide a means of heating or cooling.

As yet another example, antennas and related components can be incorporated into the design space behind the tile units for transmitting and receiving radiofrequency (RF) signals. The use of electro-magnetic radiation in the RF bands as a means for distributing information is a nearly ubiquitous part of modern life. Typically, the transmission and reception of RF signals is accomplished using antenna structures of various types. The optimum size and design for a given antenna is highly dependent upon the intended use, where position or location, range, frequency band(s), general performance and service life all play a part in the design. For applications inside buildings, the antennas deployed typically form a component of a wireless network, where a number or multitude of transmitter/receiver antennas are used to move wireless data throughout the interior (or even outside) of the building. Such devices would generally be described as discrete and separate units that do not form part of the interior decoration of the space. As such, these devices are not decorative, and it is desirable that they be relatively small and unobtrusive. To the extent that such design constraints do not fatally compromise their function and performance, the antennas for these devices are made as small as possible.

The performance of an antenna, which is essentially a two-dimensional conductive circuit of some preferred pattern, is based on many factors, one of which is the available space. The efficiency with which the antenna transmits or in particular collects the RF signal of interest is directly related to its absorption cross-section, which is influenced by its size or surface area. In certain instances, it may be desirable to improve the antenna performance by increasing its size; however, the limitations of available space or the need to be unobtrusive might render such improvements impossible.

The design space behind the tile units allows for the unobtrusive deployment of larger antenna structures than what might normally be acceptable inside buildings, leading to new wireless network strategies, increased performance and/or lower overall system costs. The design space can also facilitate the unobtrusive placement of the electrical connections that are needed for power/signal to and from the antenna.

In order to facilitate these enhanced functionalities, the design space must have the appropriate dimensions. The depth of the design space can be controlled by the thickness of the base plates of the mounting units and/or the design of the tile unit-fastening devices that engage the tile units and the mounting units. That is, as the thickness of the base plates increases and/or the amount of the protruding portions of the tile unit-fastening devices that do not engage with the engaging/receiving portions increases, so too does the depth of the gap or design space. In addition, the lateral area of the design space can be controlled by the lateral area of the base plates of the mounting units. The total lateral area of the design space is simply the total area of all of the base plates used to secure the tile units subtracted from the area of the surface of the wall that is covered. Thus, when base plates with small areas are used, the lateral area of the design space can be maximized.

In addition to the above, the design space can be increased when the "wall" on which the tile system is mounted has additional space behind it. For example, if the mounting units were mounted directly onto studs, rather than dry-wall (or another solid surface), the design space can be increased by an amount corresponding to the thickness of the studs themselves. Further, if there is no solid surface on the other side of the studs, then the design space is increased by an even greater dimension.

Another way to increase the design space is to provide open spaces in the tile platform of the tile unit. In one example, if the tile unit were a porous board material, a portion of the porous board material can be removed in order to create a larger design space.

For most applications, the mounting unit(s) occupy less than 30 percent of the total wall space to be covered by the tile units. In some embodiments, the mounting unit(s) occupy less than 20 percent of the total wall space to be covered by the tile units. In other embodiments, the mounting unit(s) occupy less than 10 percent of the total wall space to be covered by the tile units.

Another optional additional design feature is the inclusion of a locating or alignment peg or other such structure on one of the base plate of the mounting unit or on the bottom of the tile unit, along with a corresponding hole or other such structure on the other of the base plate of the mounting unit or on the bottom of the tile unit. These devices can be used to precisely align the mounting unit with the tile unit for engagement. One such structure is shown in FIG. 7(b). This would be particularly advantageous for installations using the second example of a method for positioning the mounting units described above (i.e., where the tile unit is mounted to the mounting unit before the mounting unit is affixed to the wall).

Another optional additional design feature involves a mechanism between adjacent tile units to facilitate their mutual alignment. This feature can manifest itself in the form of a splice joint (e.g., half-lap splice, bevel splice, rabbet splice or the like), scarf joint, or other non-mechanical interlocking joint between at least a portion of the side walls of the polymeric frames of adjacent tile units. These joints are not necessary for installing the tile units but can be used to improve alignment. That is, these joints are not intended to provide a means for countering the force of gravity (to securely affix the tile unit to the wall via the mounting unit), but instead can be used to ensure that two adjacent tile units are in the proper positions with respect to each other. Another version of such a joint might involve each side of the joint comprising a thin film or layer of a compliant material (e.g., silicone) that can act as a seal when adjacent tile units are installed.

Figure 15:
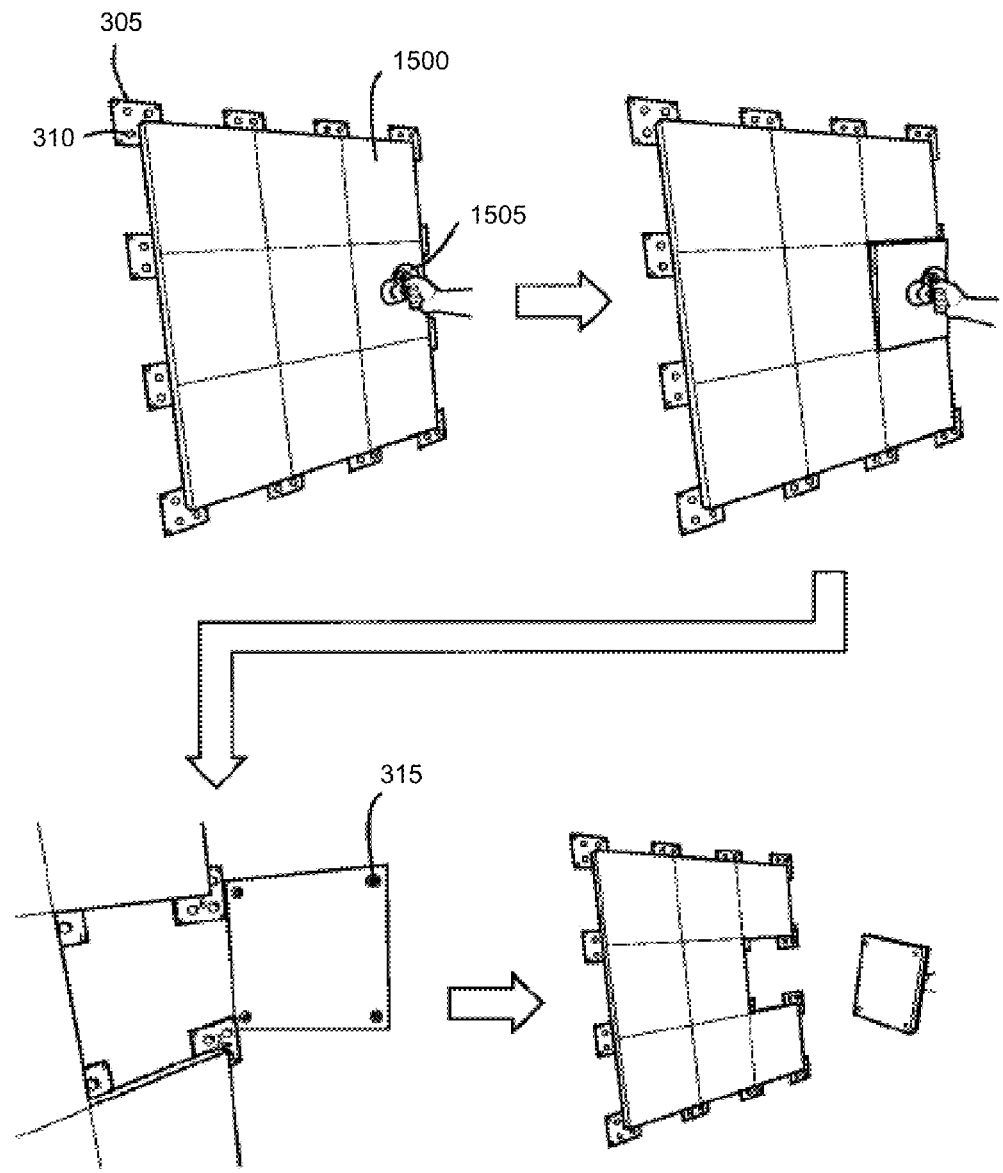
FIGS. 15(a) and (b) include schematic illustrations of processes for removing a tile unit from a wall without damage using a suction cup tool according to some embodiments of the present invention.
Figure 15:
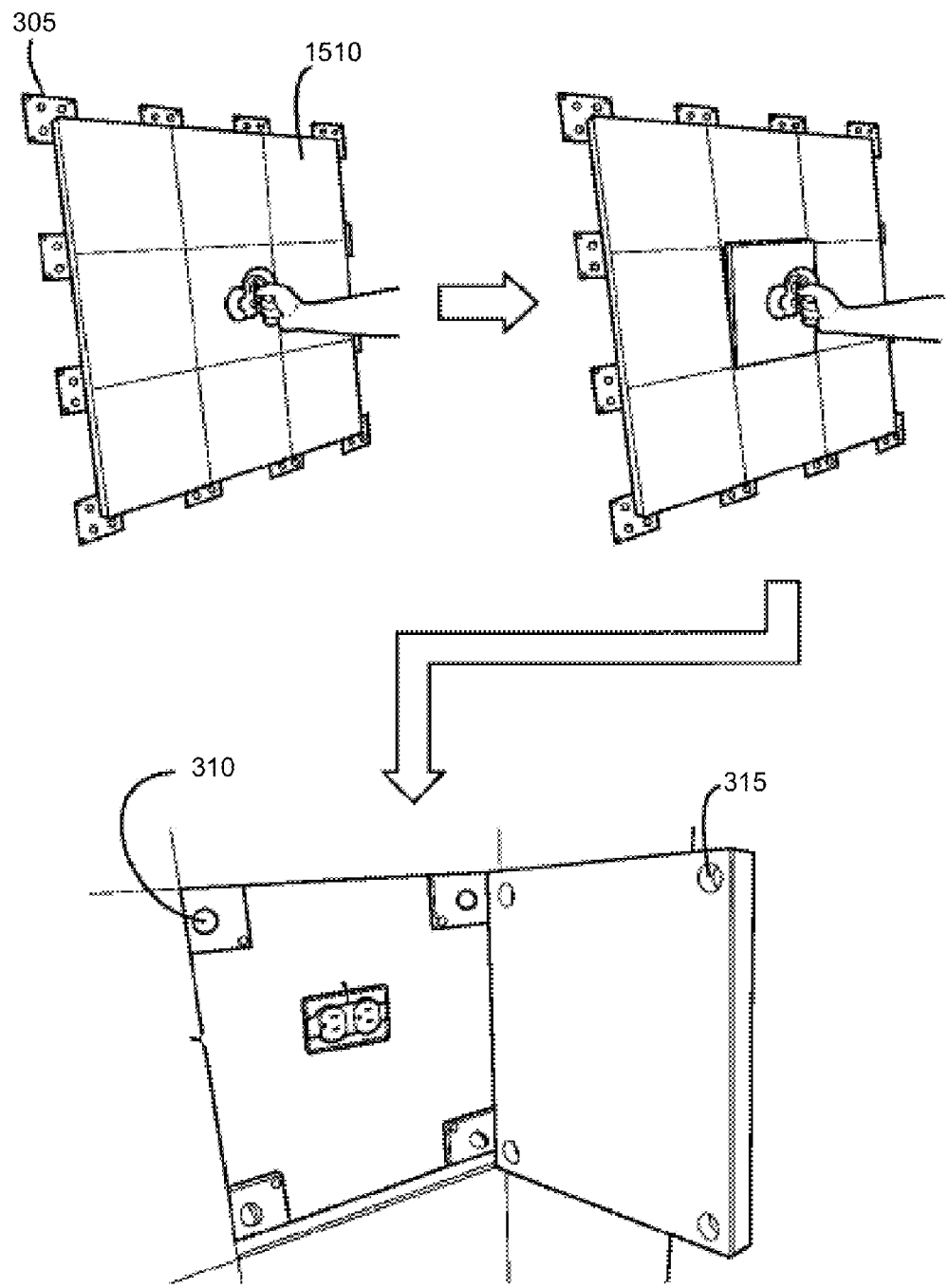

Yet another optional additional design feature of the tile systems is the ability to disengage a tile unit from a mounting unit without irreparably damaging the components of the tile unit, the mounting unit, or the wall. This ability is heavily influenced by the design of the tile-unit fastening devices. The optimal tile-unit fastening device design for such purposes provides the expected secure engagement between the tile unit and its mounting units, while requiring a specific amount of force to remove the tile unit. This removal force is greater than the force of gravity, and greater than the force required to support all adjacent tile units (or items mounted on the wall) that exert a normal force on the tile unit while it is secured to the wall. The tile units can be removed using, for example, a suction cup-like tool similar to those used to handle and install sheets of glass. FIGS. 15(a) and (b) provide schematic illustrations of a process for removing an end tile unit 1500 and an interior tile unit 1510, respectively, using such a tool 1505. It is this modular, reconfigurable capability of the tile system that can provide many benefits to the end-use customer, particularly in commercial applications.

For certain applications, it can be desirable to provide the tile units with water-resistance or water-tightness. In yet another optional additional design feature of the tile systems disclosed herein, such properties can be provided. Providing a water-tight seal between the decorative tiles that are encapsulated by the polymeric frame component in a given tile unit can be accomplished with relative ease using, for example, one of several types of flexible sealing material (e.g., silicone). The flexible sealing material can be applied to the tile unit by the manufacturer, by a contractor prior to installation or by the end user before or during installation. Appropriate selection of the sealing material will allow designers to change the appearance of the tile system without negatively impacting the ability to easily remove the tile unit without irreparable damage to the wall, decorative tile, or both.

Figure 16:
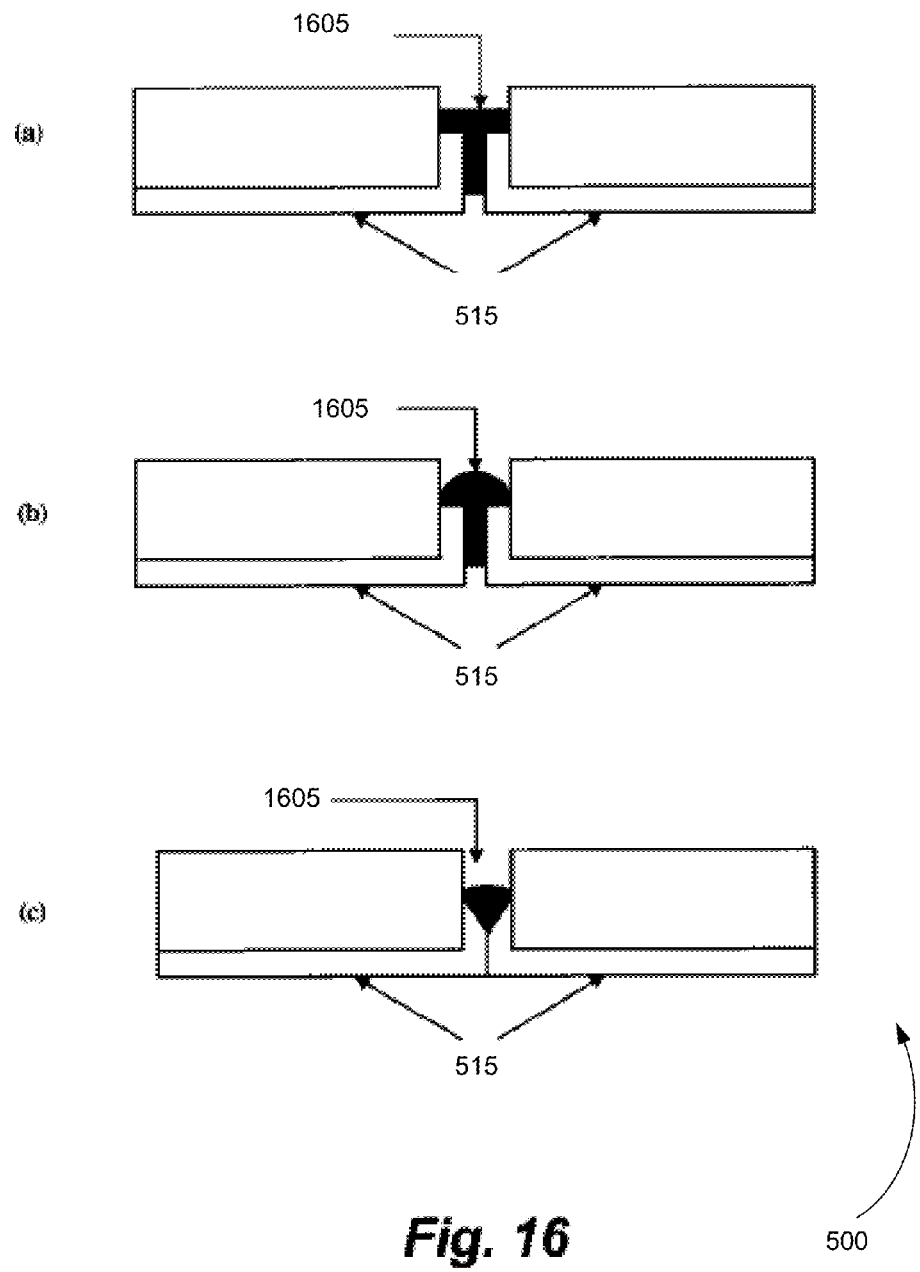
FIG. 16 is a schematic illustration of various designs for providing a seal between adjacent tile units according to some embodiments of the present invention.

In contrast, providing such a seal between adjacent tile units generally must be accomplished during installation. Doing so should not preclude or eliminate other desirable properties of the tile systems (e.g., ease of installation, appearance, and manufacturing). Adhesive products, such as acrylic foam tapes, which are used specifically for the weather-proofing of architectural glazing products when installed on the outside surfaces of buildings, can be used to accomplish this goal. These tape products can be used to provide a compliant, yet strong, mechanical bond between adjacent tile units. Examples of such tapes, and their implementation between adjacent tile units, are shown in FIG. 16. These tapes 1605 can be applied after adjacent tile units 500 have been secured to the wall. Alternatively, a double-sided piece of such a tape 1605 could be applied to one or more sides of a tile unit 500 during manufacture or prior to installation. The installer could then peel the backing from the other side of the tape immediately before securing an adjacent tile unit to the wall. In some instances, a tape formulation can be used where the adhesive quality is only slightly tacky upon installation, but becomes stronger and more permanent (e.g., by curing) over a relatively short period of time. For aesthetic reasons, the adhesive product 1605 can be installed with different shapes, as shown in FIG. 16. Another example of a sealing material includes pre-formed caulking, much like that used to seal windows, which is available with a round or other cross-sectional shape and delivered on rolls. Further, the dimensions and profile of the polymeric frame portion of the tile unit, as seen in FIG. 16, could be designed so as to facilitate the attractive and easy installation of such a seal during installation.

The various embodiments of the present invention are further illustrated by the following non-limiting examples.

EXAMPLES

Example 1

Fabrication of a Tile Unit

Figure 17:
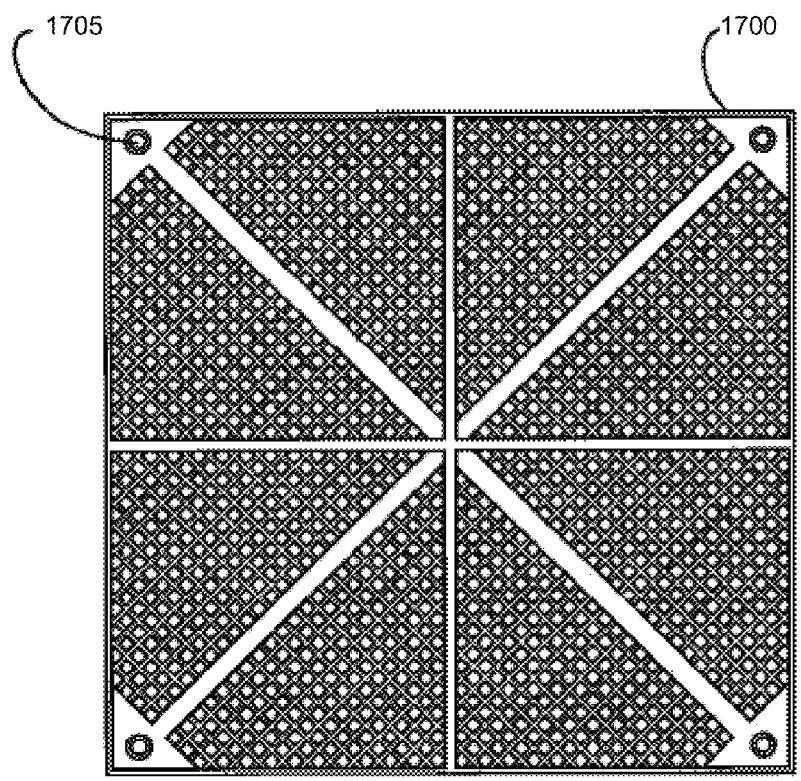
FIG. 17 is a schematic illustration of a polymeric frame unit according to Example 1.

In this example, a tile unit was formed from SOMOS DMX-SL 100, an ABS-like polymer, as the polymeric frame, and ceramic tiles as the decorative tiles. The polymeric frame component was manufactured using a rapid prototyping stereolithographic method, which entails building up a polymeric part layer-by-layer. The resulting polymeric frame component 1700 is shown in the schematic illustration of FIG. 17. The polymeric frame 1700 includes a recessed portion 1705 for receiving the tile unit-fastening device. The front and rear sides of the receiving portion are shown in the schematic illustration of FIG. 18.

Figure 19:
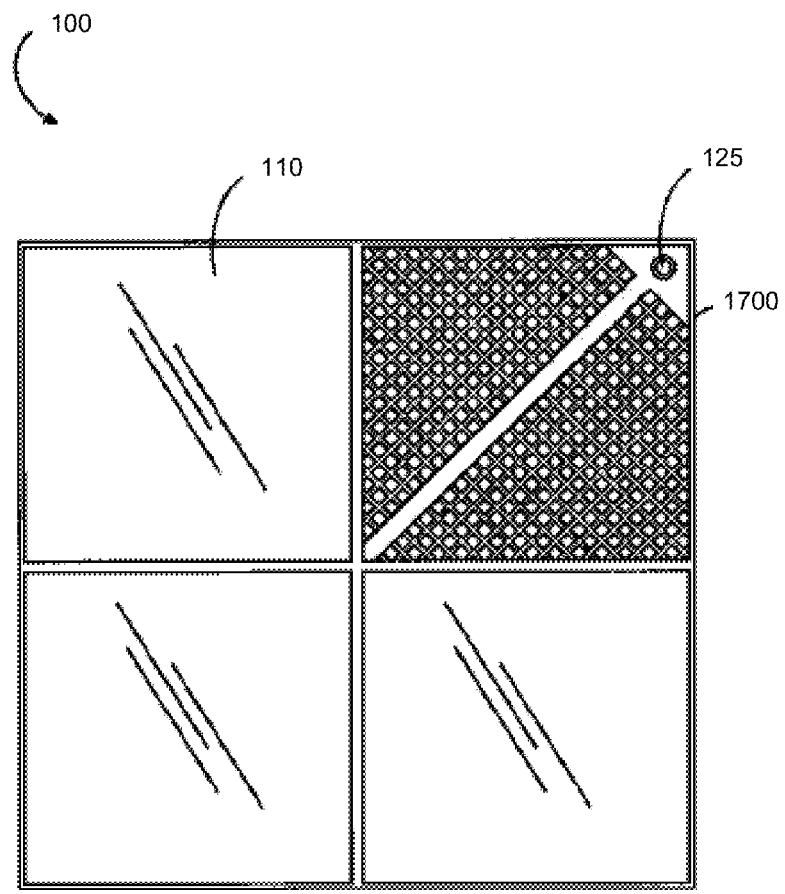
FIG. 19 is a schematic illustration of the polymeric frame unit of FIG. 17 with decorative tiles incorporated therein according to Example 1.

To fabricate a tile unit, individual ceramic tiles were disposed in each of the four recesses of the polymeric frame unit. The ceramic tiles were secured in place using a tube-delivered adhesive product (LIQUID NAILS™). A partially completed tile unit 100 is shown in FIG. 19, and a complete tile unit 100 is shown in FIG. 20.

Figure 20:
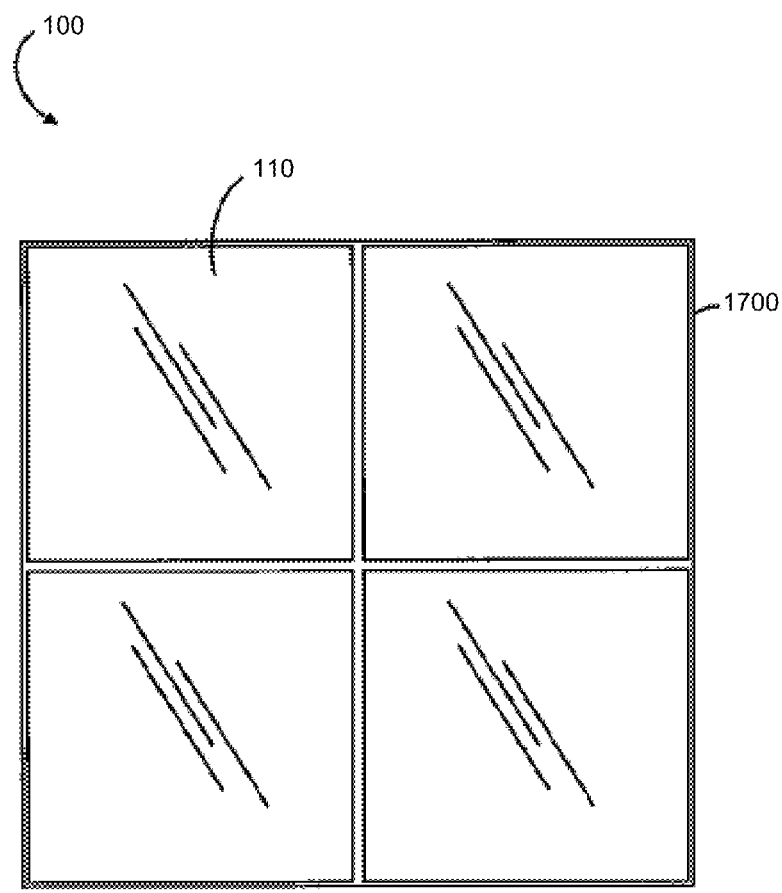
FIG. 20 is a schematic illustration of a complete tile unit according to Example 1.

As shown in FIG. 20, the assembled tile unit 100 can be aesthetically pleasing and acceptable for certain applications without integration of additional components whose primary functions are to provide a seal between adjacent decorative tiles 110 within a given tile unit 100 or between adjacent tile units. Further, the surfaces of the polymeric frame 1700 that will be visible when the tile units are installed can be molded with a texture and color as to present the appearance of traditional cementitious grout, should that appearance be desirable.

Example 2

Fabrication and Installation of a Tile Unit

In this example, a tile unit was formed by affixing a 12-inch by 12-inch porcelain ceramic tile to a five-eighths-inch thick piece of expanded polystyrene (EPS) foam board using polyurethane adhesive (Gorilla Glue®). The EPS foam board included recessed receiving portions of about three-quarters of an inch in diameter located with its center approximately 2 inches from the corner of the foam board. These receiving portions comprised plastic injection molded nylon components inserted into countersunk mounting holes on the side of the EPS foam board to which the porcelain ceramic tile was adhered. In this way, the receiving portions were secured and recessed into the EPS foam board.

During installation, these receiving portions were engaged with plastic injection molded fasteners protruding from a mounting plate, which was itself fixed to the wall using drywall screws. The mounting plate was formed from medium density fiberboard (MDF). This assembly provided approximately one-half inch of a design space or gap between the backside of the EPS foam board and the front surface of the wall.

In another implementation, the receiving portions in the EPS foam board were engaged with plastic injection molded fasteners protruding from a mounting plate that was fastened to a metal rail, which was itself screwed to wooden studs (which served as the wall). The assembly provided a design space or gap that also included the thickness of the studs.

It should be apparent to those skilled in the art to which this disclosure pertains that there are several advantages to the tile systems described herein, some or all of which can be combined to provide even more enhanced benefits. In general, the tile systems allow for the installation of the tile units on a wall surface easily and rapidly by normally skilled workers using simple tools. The tile systems do not require the lengthy times necessary to apply and set conventional tile products using conventional fixative materials. The tile units and mounting units are designed to facilitate fast and secure mounting, and, if desired, the controlled removal of the tile unit from the surface without damaging either. This capability can provide the installation contractor, architect, space designer, and/or end-use customer the ability to quickly install the decorative tile and the flexibility to quickly and inexpensively change the appearance of the surface after the initial installation. The design of the tile system also allows for the unobtrusive incorporation of electrical wiring, plumbing, and other special function materials or devices between the tile unit and wall surface. The overall tile system design facilitates the incorporation of advanced functionalities behind the tile unit such that the enabling structures (i.e., the wiring, plumbing, devices, and the like) are both hidden and easily re-configurable as needed. It is also possible for the overall tile system design to be modified to incorporate and/or coordinate with separately installed decorative panels and electronic display devices (e.g., flat panel displays, computer monitors, and the like), greatly enhancing design flexibility for a given space.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the present invention should not be limited to the above discussed embodiments, and should only be defined by the following claims and all equivalents.

What is claimed is:

1. A tile system for covering an area of a wall, comprising:
a tile unit comprising a decorative tile and a tile platform, the decorative tile having a visible front surface and the tile platform having a back surface opposite the visible front surface of the decorative tile, the back surface facing the wall, and wherein the decorative tile is disposed on or in the tile platform;
at least one mounting unit comprising a base unit;
at least one wall-fastening device configured to fasten the mounting unit to the wall; and
a tile unit-fastening multi-piece assembly configured to fasten the tile unit to the mounting unit, the tile unit-fastening multi-piece assembly comprising a first portion and a second portion, the first portion extending from the mounting unit in a direction substantially opposite from the wall and the second portion being a recessed portion in the back surface of the tile platform, wherein the first portion is configured to engage the second portion to fasten the tile unit to the mounting unit;
wherein the mounting unit occupies less than 30 percent of the area of the wall covered by the tile system;
wherein at least a portion of the back surface of the tile platform does not contact the wall directly;
wherein at least a portion of the tile platform contacts the mounting unit when the tile unit is fastened to the mounting unit; and
wherein the first portion and the mounting unit are monolithic.

2. The tile system of claim 1, wherein the tile platform is a frame component that encapsulates the decorative tile on at least a portion of five sides of the decorative tile.

3. The tile system of claim 1, wherein the tile platform is a solid or porous board.

4. The tile system of claim 1, wherein the base unit comprises a rail-like structure.

5. The tile system of claim 1, wherein the first portion comprises a repositioning mechanism configured to allow the tile unit to move in one direction parallel to the wall after the tile unit is fastened to the mounting unit.

6. The tile system of claim 1, wherein the tile unit-fastening device comprises a first portion, a second portion, and a third portion, wherein the second portion is configured to engage both the first and third portions to fasten the tile unit to the mounting unit.

7. The tile system of claim 6, wherein the first portion and the third portion extend from the mounting unit in a direction opposite from the wall, and the second portion is a recessed portion in the tile unit.

8. The tile system of claim 6, wherein the first portion and the third portion extend from the tile unit in a direction opposite from the decorative tile, and the second portion is a recessed portion in the mounting unit.

9. The tile system of claim 6, wherein the first portion and the third portion each comprise a repositioning mechanism configured to allow the tile unit to move in one direction parallel to the wall after the tile unit is fastened to the mounting unit.

10. The tile system of claim 1, wherein, when the tile unit is fastened to the mounting unit and the mounting unit is fastened to the wall, there is a gap between at least a portion of the tile unit and the wall.

11. A tile system for covering an area of a wall, comprising:
a plurality of tile units, wherein each tile unit of the plurality of tile units comprises a decorative tile and a tile platform, the decorative tiles having visible front surfaces and the tile platforms having back surfaces opposite the visible front surfaces of the decorative tiles, the back surfaces facing the wall, and wherein the decorative tiles are disposed on or in the tile platforms;
a plurality of mounting units, wherein each mounting unit of the plurality of mounting units comprises a base unit;
a plurality of wall-fastening devices, wherein each wall-fastening device of the plurality of wall-fastening devices is configured to fasten at least a portion of one mounting unit of the plurality of mounting units to a wall; and
a plurality of tile unit-fastening multi-piece assemblies, one or more of the tile unit-fastening multi-piece assemblies to fasten at least a portion of one tile unit to one mounting unit of the plurality of mounting units, each tile unit-fastening multi-piece assemblies comprising a first portion and a second portion, the first portion extending from one of the plurality of mounting units in a direction substantially opposite from the wall and the second portion being a recessed portion in the back surface of a tile platform, wherein the first portion is configured to engage the second portion;
wherein the plurality of mounting units occupies less than 30 percent of the area of the wall covered by the system;
wherein at least a portion of the back surface of each tile platform does not contact the wall directly;
wherein at least a portion of one or more tile platforms contacts one of the plurality of mounting units when one or more of the tile units is fastened to one or more of the plurality of mounting units; and
wherein a surface of the second portion is comprised of the same material as the tile platform.

12. The tile system of claim 11, wherein the tile platform is a frame component that encapsulates the decorative tile on at least a portion of five sides of the decorative tile.

13. The tile system of claim 11, wherein the tile platform is a solid or porous board.

14. The tile system of claim 11, wherein each base unit comprises a rail-like structure.

15. The tile system of claim 11, wherein the first portion comprises a repositioning mechanism configured to allow the one tile unit to move in one direction parallel to the wall after the one tile unit is fastened to the one mounting unit.

16. The tile system of claim 11, wherein each tile unit-fastening device comprises a first portion, a second portion, and a third portion, wherein the second portion is configured to engage both the first and third portions to fasten at least the portion of the one tile unit to the one mounting unit.

17. The tile system of claim 16, wherein the first portion and the third portion extend from the one mounting unit in a direction opposite from the wall, and the second portion is a recessed portion in the one tile unit.

18. The tile system of claim 16, wherein the first portion and the third portion each comprise a repositioning mechanism configured to allow the one tile unit to move in one direction parallel to the wall after at least the portion of the one tile unit is fastened to the one mounting unit.

19. The tile system of claim 11, wherein, when the plurality of tile units are fastened to the plurality of mounting units and the plurality of mounting units are fastened to the wall, there is a gap between at least a portion of each tile unit and the wall.

20. The tile system of claim 11, wherein a visible object is placed on the wall in between at least two of the plurality of tile units.

21. The tile system of claim 20, wherein the visible object is a camera, speaker, sign, placard, artwork, mirror, flat panel television display, computer display, light, photovoltaic cell, thermoelectric device, electrical heater, or a combination comprising at least one of the foregoing.

22. A method of using a tile system for covering an area of a wall, the method comprising:
fastening a mounting unit to a wall with a wall-fastening device, the mounting unit occupying less than 30 percent of the area of the wall covered by the tile system; and
fastening a tile unit-to the mounting unit with a tile unit-fastening multi-piece assembly, wherein the tile unit comprises a decorative tile and a tile platform, the decorative tile having a visible front surface, the tile platform having a back surface opposite the visible front surface of the decorative tile, and tile unit-fastening multi-piece assembly comprises a first portion and a second portion, the first portion extending from the mounting unit in a direction opposite from the wall and the second portion being a recessed portion in the back surface of the tile unit;
wherein the fastening comprises engaging the first portion into the second portion;
wherein, after fastening the tile unit to the mounting unit, at least a portion of the back surface of the tile platform does not contact the wall, and at least a portion of the tile platform contacts the mounting unit; and
wherein the first portion and the mounting unit are monolithic and wherein a surface of the second portion is comprised of the same material as the tile platform.

23. The method of claim 22, wherein fastening the tile unit to the mounting unit creates a gap between at least a portion of the tile unit and the wall.

24. The method of claim 23, further comprising disposing electrical wiring, plumbing, thermal insulation, sound insulation, an electronic device, or a combination comprising at least one of the foregoing in the gap between the wall and at least the portion of the tile unit.

25. The method of claim 22, further comprising fastening an additional tile unit to the mounting unit with an additional tile unit-fastening device.

26. The method of claim 25, further comprising repositioning the additional tile unit in a first direction that is parallel to the wall after fastening the additional tile unit to the mounting unit.

27. The method of claim 26, further comprising repositioning the additional tile unit in a second direction that is parallel to the wall and perpendicular to the first direction after fastening the additional tile unit to the mounting unit.

28. The method of claim 22, further comprising fastening an additional mounting unit to the wall with an additional wall-fastening device.

29. The method of claim 28, further comprising fastening an additional tile unit to the different mounting unit with an additional tile unit-fastening device.

30. The method of claim 28, further comprising using a spacing tool to provide a location for fastening the additional mounting unit to the wall.

31. The method of claim 22, wherein fastening the mounting unit to the wall with the wall-fastening device occurs after fastening the tile unit to the mounting unit with the tile unit-fastening device.

32. The method of claim 22, further comprising repositioning the tile unit in a first direction that is parallel to the wall after fastening the tile unit to the mounting unit.

33. The method of claim 32, further comprising repositioning the tile unit in a second direction that is parallel to the wall and perpendicular to the first direction after fastening the tile unit to the mounting unit.

34. The method of claim 22, further comprising unfastening the tile unit from the mounting unit.

35. The method of claim 34, wherein the unfastening occurs without damage to the tile unit and/or the mounting unit.

36. The method of claim 34, further comprising refastening the tile unit to the mounting unit.

* * * * *